US008713429B2

(12) United States Patent
Kraus et al.

(10) Patent No.: US 8,713,429 B2
(45) Date of Patent: Apr. 29, 2014

(54) GENERATING WIKI PAGES FROM CONTENT AND TRANSFORMATION OBJECTS

(75) Inventors: Joe Kraus, Palo Alto, CA (US);
Graham Spencer, Palo Alto, CA (US)

(73) Assignee: Google Inc., Mountain View, CA (US)

(*) Notice: Subject to any disclaimer, the term of this patent is extended or adjusted under 35 U.S.C. 154(b) by 907 days.

(21) Appl. No.: 12/165,410

(22) Filed: Jun. 30, 2008

(65) Prior Publication Data
US 2009/0063953 A1    Mar. 5, 2009

Related U.S. Application Data

(62) Division of application No. 11/344,957, filed on Jan. 31, 2006, now Pat. No. 7,584,268.

(60) Provisional application No. 60/649,364, filed on Feb. 1, 2005.

(51) Int. Cl.
*G06F 15/16* (2006.01)

(52) U.S. Cl.
USPC .......................................... 715/243; 715/255

(58) Field of Classification Search
None
See application file for complete search history.

(56) References Cited

U.S. PATENT DOCUMENTS

| 5,937,160 | A | 8/1999 | Davis et al. | |
|---|---|---|---|---|
| 2002/0103856 | A1* | 8/2002 | Hewett et al. | 709/203 |
| 2008/0040661 | A1* | 2/2008 | Curtis et al. | 715/243 |

FOREIGN PATENT DOCUMENTS

EP            0948160 A2    10/1999

OTHER PUBLICATIONS

W3C, "XSL Transformations (XSLT) Version 1.0," 58 pages (Nov. 16, 1999).*
Bazac, "The Meta Search Engines: A Web Searcher's Best Friends", 5 pages (Sep. 2002) available at www.llrx.com/features/metasearch.htm.*
Thoeny, "Include Topics and Web Pages", TWiki, 2 pages (Aug. 2004) available at http://www.program-transformation.org/TWiki/IncludeTopicsAndWebPages.*
Thoeny, "Inter-Wiki Link Rules (or Links to other Sites)", CERN TWiki, Revision 3 (dated Apr. 21, 2002) available at https://twiki.cern.ch/twiki/bin/view/TWiki/InterWikis?rev=3.*
Examination Report for European Patent Application No. EP 06734183.4, Nov. 18, 2010, 5 pages.
"TWiki Reference Manual (Sep. 4, 2004 $Rev: 1742 $)" Sep. 4, 2004, 231 pages, [online] [retrieved on Oct. 15, 2010] Retrieved from the Internet: <URL:http://twiki.org/>.
Supplementary European Search Report, European Patent Application No. EP 06734183, Feb. 4, 2009, 7 pages.
Examiner's First Report on Australian Patent Application No. 2006210795, Apr. 28, 2010, 1 page.
Notice of Preliminary Rejection issued by Korean Intellectual Property Office for Korea Patent Application No. 10-2007-7019960, Jun. 14, 2010, 5 Pages.
Examiner's First Report on Australian Patent Application No. AU 2011201067 mailed Jan. 11, 2012, 2 pages.

* cited by examiner

*Primary Examiner* — Doug Hutton, Jr.
*Assistant Examiner* — Scott M Kelly
(74) *Attorney, Agent, or Firm* — Young Basile Hanlon & MacFarlane P.C.

(57) ABSTRACT

Collaborative web pages are enabled which allow every page on a website to be editable by an author and by others the author lets access the site. Web pages can send and receive email messages. Users can attach files to pages. Structure queries and page-building are enabled by use of various forms and form elements.

12 Claims, 20 Drawing Sheets

Enter new contact: 1101

[Go]

My Contacts:

| WikiPage | FirstName | LastName | Phone | State |
|---|---|---|---|---|
| bob | bob | dog | 555-555-5555 | ma |
| BojanglesTheMan | sdfdfs | sdfsdfsdf | 213123 | 123123 |
| BongiBen | Ben | Scott | 0141 959 8218 | UK |
| BradPitt | Brad | Pitt | 555-1212 | CA |
| Eric Yoon | Eric | Yoon | 6463352197 | NY |
| Erine | Erine | James | 94150 2345 | NY |
| FooBar | Foo | Bar | 219-555-5555 | Oregon |
| HarryFlint | Harry | Flint | 310-940-9483 | California |
| Homer Simpson | Homer | Simpson | KL5 1212 | ?? |
| JakeTurner | Jake | Turner | 555-385-1911 | Texas |
| JaneSmith | Jane | Smith | 415-786-7865 | |
| MaryJones | Mary | Jones | 650-483-9494 | California |
| Steve | Steve | Foster | 99991111 | CA |
| SteveMcQueen | Steve | McQueen | 716-555-1212 | Indiana |
| SuzyFlint | Suzy | Flint | 310-940-9483 | California |
| WolfieLo | Artura | Lobo | 555-5555 | NC |

| WikiPage | Caller | Recipi-ent | AnsweredBy | Date | Summary | Action |
|---|---|---|---|---|---|---|
| DailyCall0 | Jane Doe | Smith Sane | Mary Jane | 11/29/2004 9:27PM | Enquired about product release | Send Email |

Enter New Call — 1301

Daily Calls:

| | | | Create event | | | |
|---|---|---|---|---|---|---|
| | | | January 2005 | | | |
| Sun | Mon | Tue | Wed | Thur | Fri | Sat |
| 26 | 27 | 28 | 29 | 30 | 31 | 1 |
| 2 | 3 | 4 | 5 | 6 | 7 | 8 |
| 9 | 10 | 11 | 12 | 13 | 14 | 15 |
| | | Event30 | | Event29 | | Event32 |
| 16 | 17 | 18 | 19 | 20 | 21 | 22 |
| 23 | 24 | 25 | 26 | 27 | 28 | 29 |
| 30 | 31 | 1 | 2 | 3 | 4 | 5 |

Create event

January 2005

| Sun | Mon | Tue | Wed | Thur | Fri | Sat |
|---|---|---|---|---|---|---|
| 26 | 27 | 28 | 29 | 30 | 31 | 1 |
| 2 | 3 | 4 | 5 | 6 | 7 | 8 |
| 9 | 10 | 11 | 12 | 13 | 14 | 15 |
| 16 | 17 | 18 | 19 | 20 | 21 | 22 |
| <u>Indianapolis – New England</u><br>1:31PM<br>Foxboro<br>23 | 24 | 25 | 26 | 27 | 28 | 29 |
| 30 | 31 | 1 | 2 | 3 | 4 | 5 |

All Candidates

| ID # | Name | Position | Status | Phone | Email | Current Company |
|---|---|---|---|---|---|---|
| JohnnyAppleseed | Johnny Appleseed | Chief Engineer | Open | 781-555-6868 | jappleseed@ibm.com | IBM |
| ViannaChu | Vianna Chu | Java Software Engineer | Rejected | 987-765-7651 | vianna@gmail.com | Cisco |
| JustinLake | Justin Lake | Java Software Engineer | Open | 897-997-1234 | justin@lake.com | Intel |
| BenSmith | Ben Smith | Java Software Engineer | Open | 786-6754 | ben@smith.com | Disney |
| AugustMason | August Mason | Java Software Engineer | Rejected | 766-765-5899 | august@yahoo.com | Sun |
| LaneyJolie | Laney Jolie | Java Software Engineer | Open | 415-890-654 | laneyjolie@yahoo.com | ATT |

Open Candidates

| ID # | Name | Position | Status | Phone | Email | Current Company |
|---|---|---|---|---|---|---|
| JohnnyAppleseed | Johnny Appleseed | Chief Engineer | Open | 781-555-6868 | jappleseed@ibm.com | IBM |
| JustinLake | Justin Lake | Java Software Engineer | Open | 897-997-1234 | justin@lake.com | Intel |
| BenSmith | Ben Smith | Java Software Engineer | Open | 786-6754 | ben@smith.com | Disney |
| LaneyJolie | Laney Jolie | Java Software Engineer | Open | 415-890-654 | laneyjolie@yahoo.com | ATT |

} 1801

Rejected Candidates

| ID # | Name | Position | Status | Phone | Email | Current Company |
|---|---|---|---|---|---|---|
| ViannaChu | Vianna Chu | Java Software Engineer | Rejected | 987-765-7651 | vianna@gmail.com | Cisco |
| AugustMason | August Mason | Java Software Engineer | Rejected | 766-765-5899 | august@yahoo.com | Sun |

My Clients:

| WikiPage | Company Name | Contact Name | Address | Phone | Fax | Website |
|---|---|---|---|---|---|---|
| Apple | Apple Computer, Inc. | Jim Brown | 1 Infinite Loop, Cupertino, CA, 95014 | 408-996-1010 | 408-996-2020 | http://www.apple.com |
| apple | new | bac | a, b | 123 | 456 | www.my.com |
| DisneyCorp | Disney Corp., Inc. | James Dean | 500 S. Buena Vista St., Burbank, CA, 91521 | 818-560-1000 | 818-560-1930 | www.disney.go.com |

1900

| Client Company: | Disney Corp., Inc. |
| --- | --- |
| Client Contact: | James Dean |
| Address: (*separate by comma*) | 500 S. Buena Vista St., Burbank, CA, 91521 |
| Phone: | 818-560-1000 |
| Fax: | 818-560-1930 |
| Website: | www.disney.go.com |

| [-] Map & Driving Directions |
| --- |

| Map Location: 500 S. Buena Vista St., Burbank, CA 91521<br>(Show map \| Hide map \| Driving Directions) |
| --- |

| [+] Yahoo News Search:  Disney |
| --- |

| Yahoo! News – Search Results for Disney |
| --- |
| Disney:  A Long-Term Ride (The Motley Fool via Yahoo! News) |
| Super Bowl Champs Won't Be 'Going To Disney World' (WESH NewsChannel2000.com via Yahoo! News) |
| Disney to report first-quarter results Monday (CBS Market Watch) |
| Disney to report first-quarter results Monday – UPDATE 1 (AFX via Yahoo! UK & Ireland Finance) |
| Going to Disney World after Super Bowl win?  Not this time (San Jose Mercury News) |
| Disney Annual Meeting My Be Happier Place This Year (IWon – Money) |
| Disney halts famed 'I'm going' Super Bowl ads (Fox Sports) |
| Disney Wins as Judge Refuses New Pool Trial (Reuters via Yahoo! News) |
| Disney:  A Long-Term Ride (The Motley Fool via Yahoo! News) |
| Super Bowl XXXIX – whose not going to Disney World (Sports Business News) |

| [+] Hoovers Search:  Disney |
| --- |

| Company Type | Business Segment of Walt Disney |
| --- | --- |
| D&B D-U-N-S Number | Subscribers Only |
| Fiscal Year-End | September |
| 2003 Sales (mil.) | $346.2 |
| 1-Year Sales Growth | 12.9% |
| 2003 Net Income (mil.) | $10.7 |
| 2003 Employees | 711 |
| 1-Year Employee Growth | 9.7% |

| Position | Name |
| --- | --- |
| Managing Director (UK and Ireland) | Cindy Rose |
| Director of Programming and Commissions | James Neal |
| Public Relations | Claire Harding |

GENERATING WIKI PAGES FROM CONTENT AND TRANSFORMATION OBJECTS

CROSS-REFERENCE TO RELATED APPLICATION

This application is a divisional of U.S. patent application Ser. No. 11/344,957 filed on Jan. 31, 2006, which claims priority to U.S. Provisional Application Ser. No. 60/649,364 entitled "Collaborative Web Page Authoring", filed Feb. 1, 2005, which are all incorporated by reference herein in their entirety.

FIELD OF THE INVENTION

The present invention relates generally to various techniques for improving authoring of collaborative applications including collaborative web page authoring.

BACKGROUND OF THE INVENTION

A wiki is a website designed for collaboration. Unlike a traditional website where pages can only be read, in a wiki everyone can edit, update and append pages with new information and without knowing HTML.

Wikis are useful for many types of collaboration, from writing documents and managing projects to creating intranets or extranets.

Fixing errors on (or updating) most intranets can be cumbersome. A user must:
  Document the problem
  Figure out who has the power to make changes
  Convince them to do it
  Wait for that person to do the work Most people find it's not worth the trouble. The intranet withers slowly.

SUMMARY OF THE INVENTION

The present invention provides various techniques for improving collaborative web page authoring and editing. These techniques can be implemented singly or in any combination.

The present invention makes every page editable, directly by an author and the people the author lets access the site.

In one embodiment, every page in a wiki has an email box or some other control for sending email. Users can send email to and from any page in the wiki. Users can attach any type of file to any page. All pages in the wiki are full-text indexed and searchable.

In one embodiment, the present invention allows a user to add structure to wiki pages using forms.

In one embodiment, the present invention is able to composite data from multiple web sources into a wiki.

In one embodiment, the present invention provides an easy-to-use application platform that facilitates the creation of multi-user web applications in a very short period of time.

BRIEF DESCRIPTION OF THE DRAWINGS

The accompanying drawings illustrate several embodiments of the invention and, together with the description, serve to explain the principles of the invention.

FIG. 11 is an example of a contact manager within a user-editable website according to one embodiment of the present invention.

FIG. 13 is an example of a call log summary within a user-editable website according to one embodiment of the present invention.

FIG. 15 is an example of a calendar within a user-editable website according to one embodiment of the present invention.

FIG. 16 is an example of an advanced calendar within a user-editable website according to one embodiment of the present invention.

FIG. 17 is an example of a job candidate table within a user-editable website according to one embodiment of the present invention.

FIG. 18 is an example of another view of a job candidate table within a user-editable website according to one embodiment of the present invention.

FIG. 20 is an example depicting incorporated content in a user-editable website according to one embodiment of the present invention.

One skilled in the art will recognize that these Figures are merely examples of the operation of the invention according to various embodiments, and that other architectures and modes of operation can be used without departing from the essential characteristics of the invention.

DESCRIPTION OF THE INVENTION

In the context of the present invention, the term "wiki" refers to a piece of server software that allows users to freely create and edit Web page content using any Web browser. "Wiki" also refers to a set of web pages that is generated and maintained using wiki software. As is known in the art, the wiki protocol supports hyperlinks and has a simple text syntax for creating new pages and crosslinks between internal pages on the fly.

Editable Pages

A wiki page is a web page that can be edited by (potentially) anybody who views it. This enables quick collaboration in work groups. Every page has a name (usually a WikiWord), and a path that determines where exactly it is located in the wiki.

A wiki page also has any number of arbitrary properties, which apply structure to an otherwise unstructured wiki page. Properties are usually applied by and are made visible by wiki forms.

The present invention makes every page editable, directly by an author and the people the author lets access the site.

Figure 1:
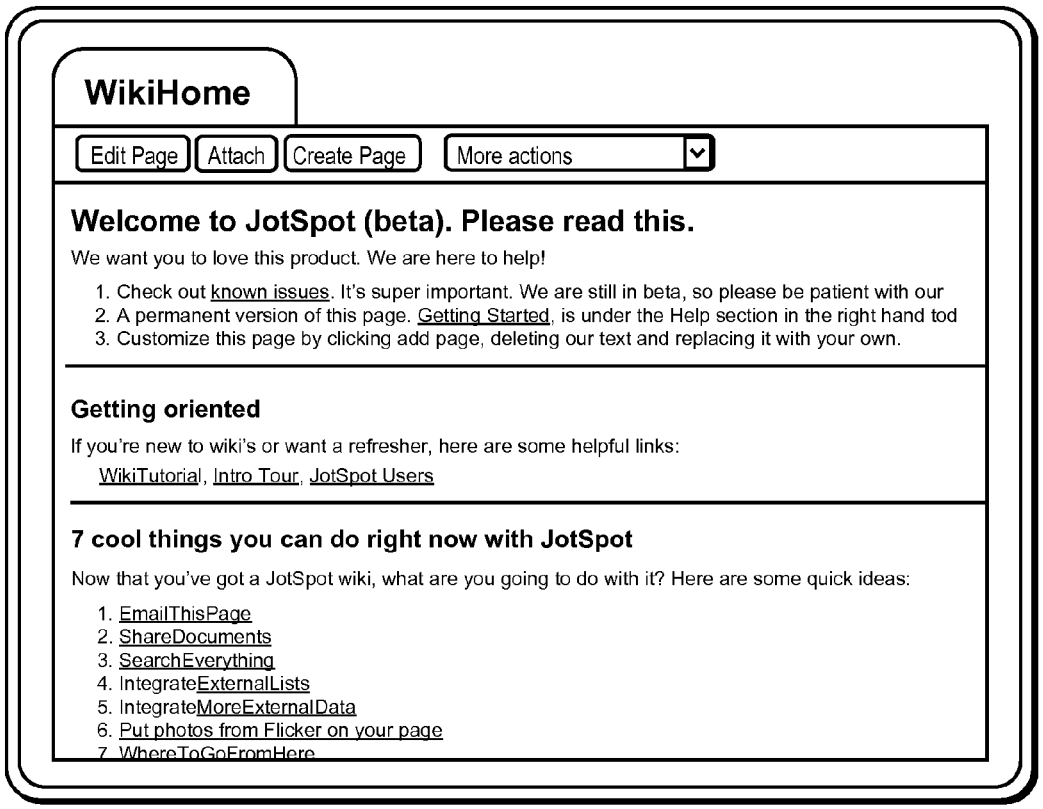
FIG. 1 is a screen shot depicting an example of a welcome page for a user-editable website according to one embodiment of the present invention.

FIG. 1 is a screen shot depicting an example of a welcome page 100 for a user-editable website according to one embodiment of the present invention.

Automatic Linking

Every page the user creates has a title. To link to that page, a user need only write that page's title on any other page in the wiki. A link is automatically created, without the need to type any HTML code.

WYSIWYG Editing

The author gives a page a title. To link to that page, a user writes that page's title on any other page in a wiki and a link will be automatically created—no HTML required. Users can edit every page in a wiki using familiar tools for graphical editing.

Figure 2:
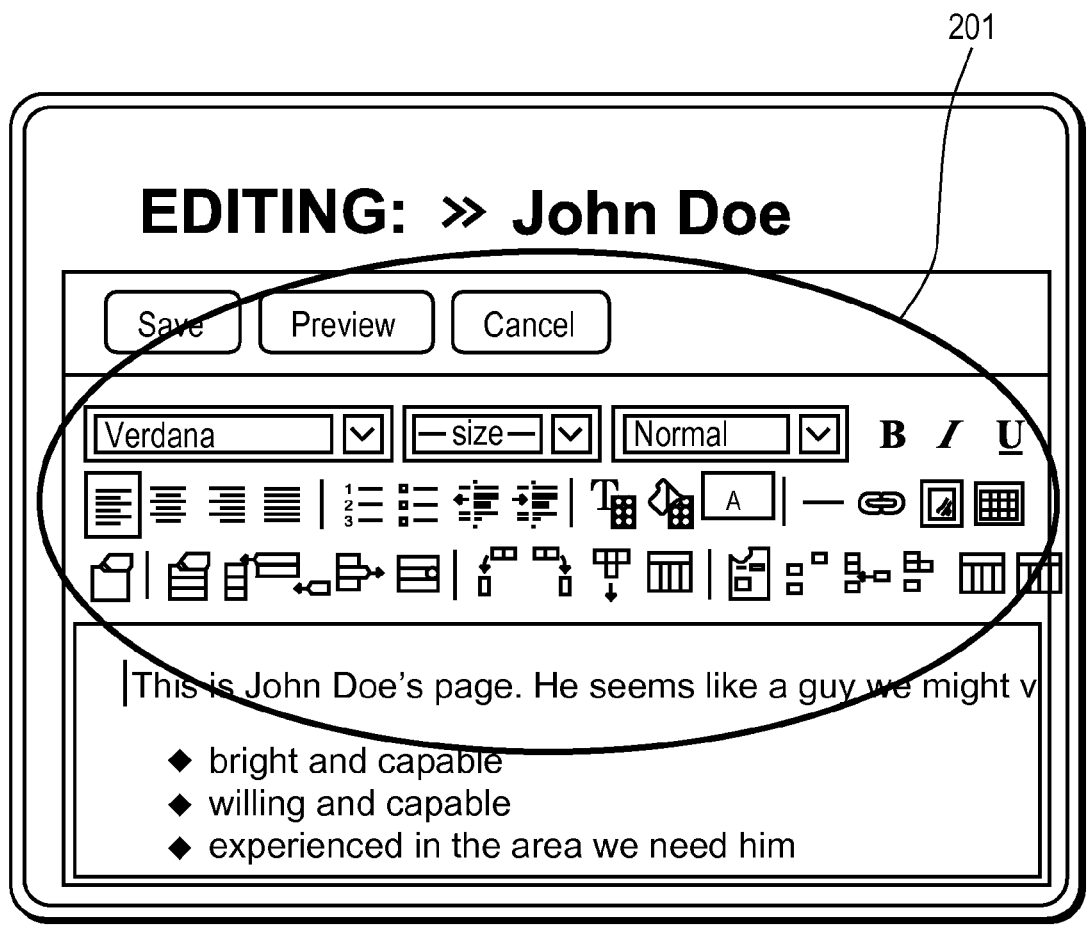
FIG. 2 is a screen shot depicting examples of editing tools for a page within a user-editable website according to one embodiment of the present invention.

FIG. 2 is a screen shot depicting examples of editing tools 201 for a page within a user-editable website according to one embodiment of the present invention.

Email to a Page

Figure 3:
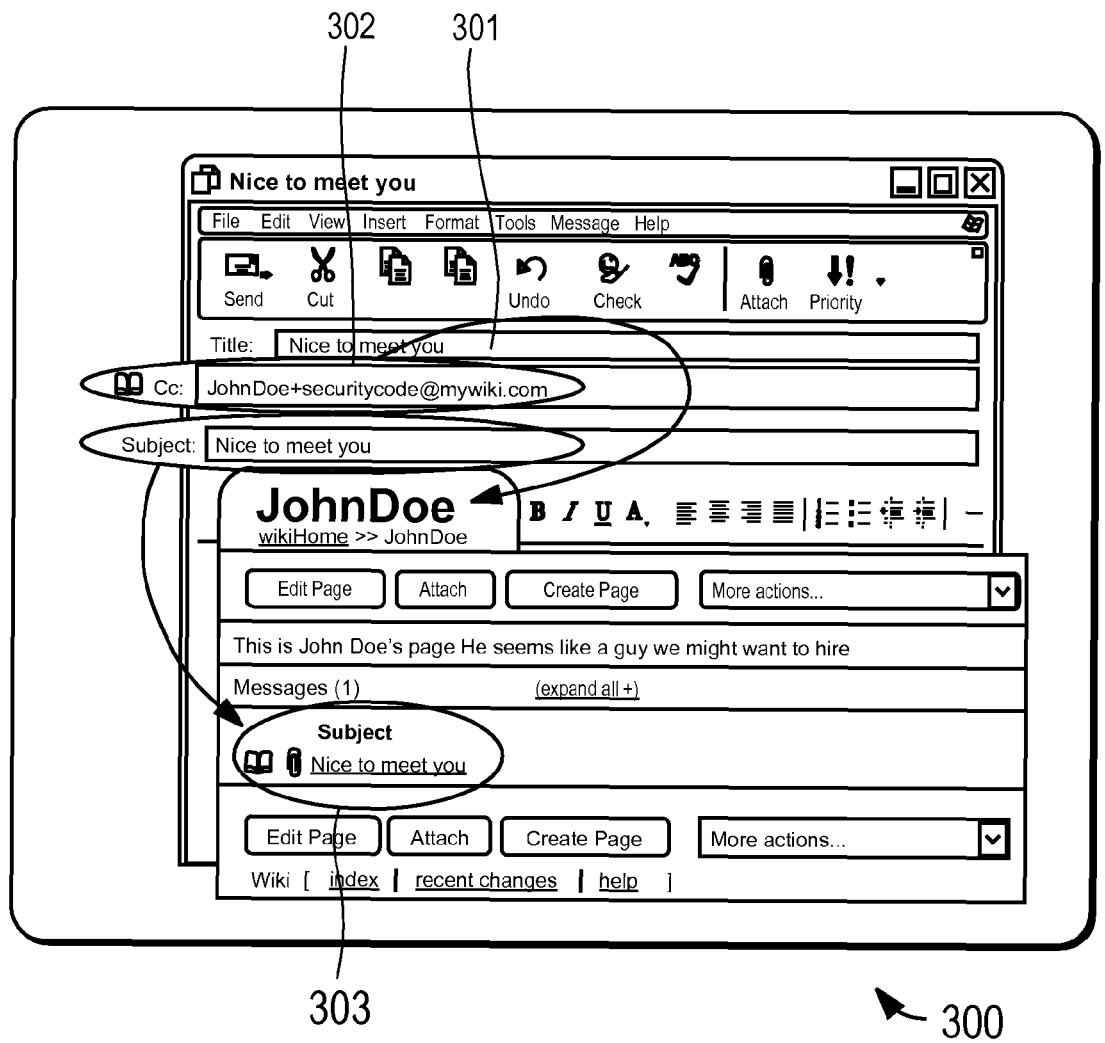
FIG. 3 is a screen shot depicting an example of a user interface for sending email to a page within a user-editable website according to one embodiment of the present invention.

FIG. 3 is a screen shot depicting an example of a user interface 300 for sending email to a page within a user-editable website according to one embodiment of the present invention.

In one embodiment, every page in a wiki has an email box or some other control for sending email. Users can send email to and from any page in the wiki. To send email to a page, a user types the page title 301 and an authentication code 302 (assigned by an administrator), and the email contents 303 automatically get attached to the page, indexed and archived. Users can send email out of the wiki as well.

Attachments

Figure 4:
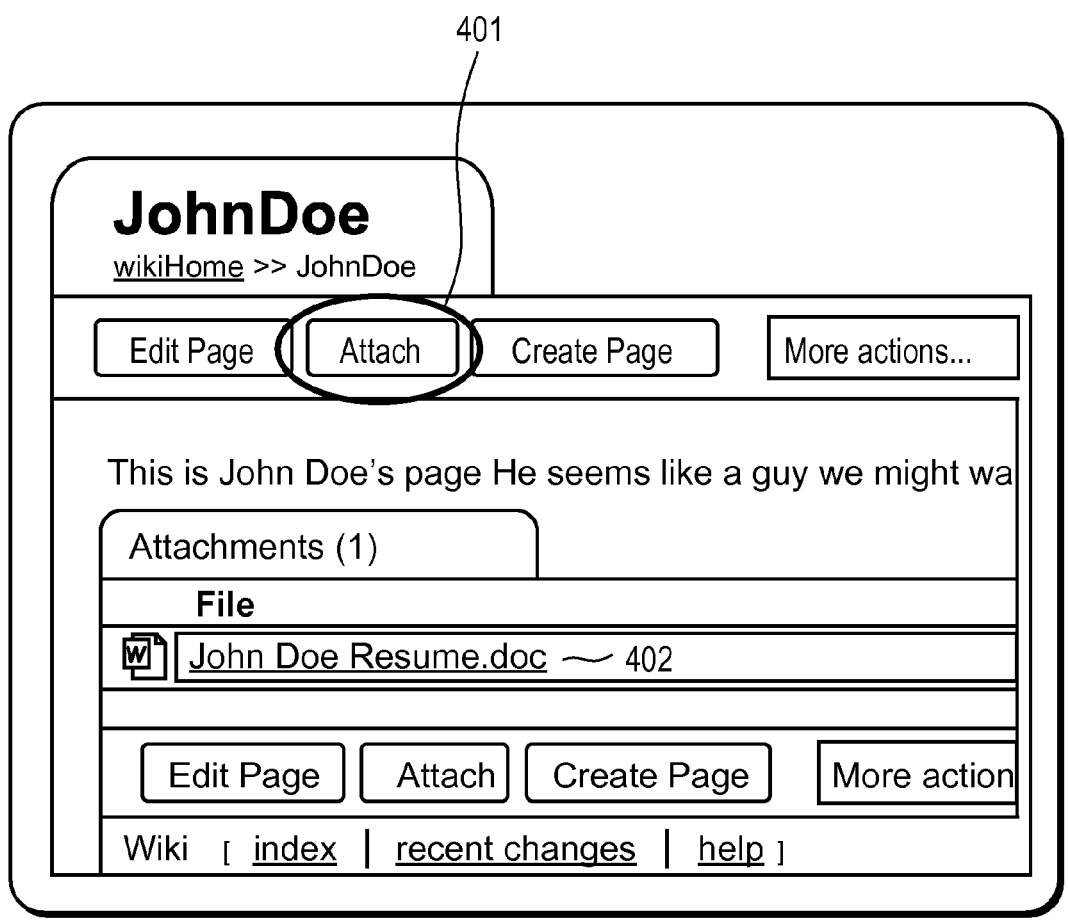
FIG. 4 is a screen shot depicting an example of a user interface for attaching a file to a page within a user-editable website according to one embodiment of the present invention.

FIG. 4 is a screen shot depicting an example of a user interface for attaching a file to a page within a user-editable website according to one embodiment of the present invention. Users can attach any type of file to any page by clicking on Attach button 401 and selecting the attachment 402.

Some files, such as MS Word® and MS Excel® files, are automatically indexed for search. In one embodiment, all attachments have the same revision control as any other page in the wiki. In one embodiment, binary attachment data is stored as another property of a page.

Indexing

Figure 5:
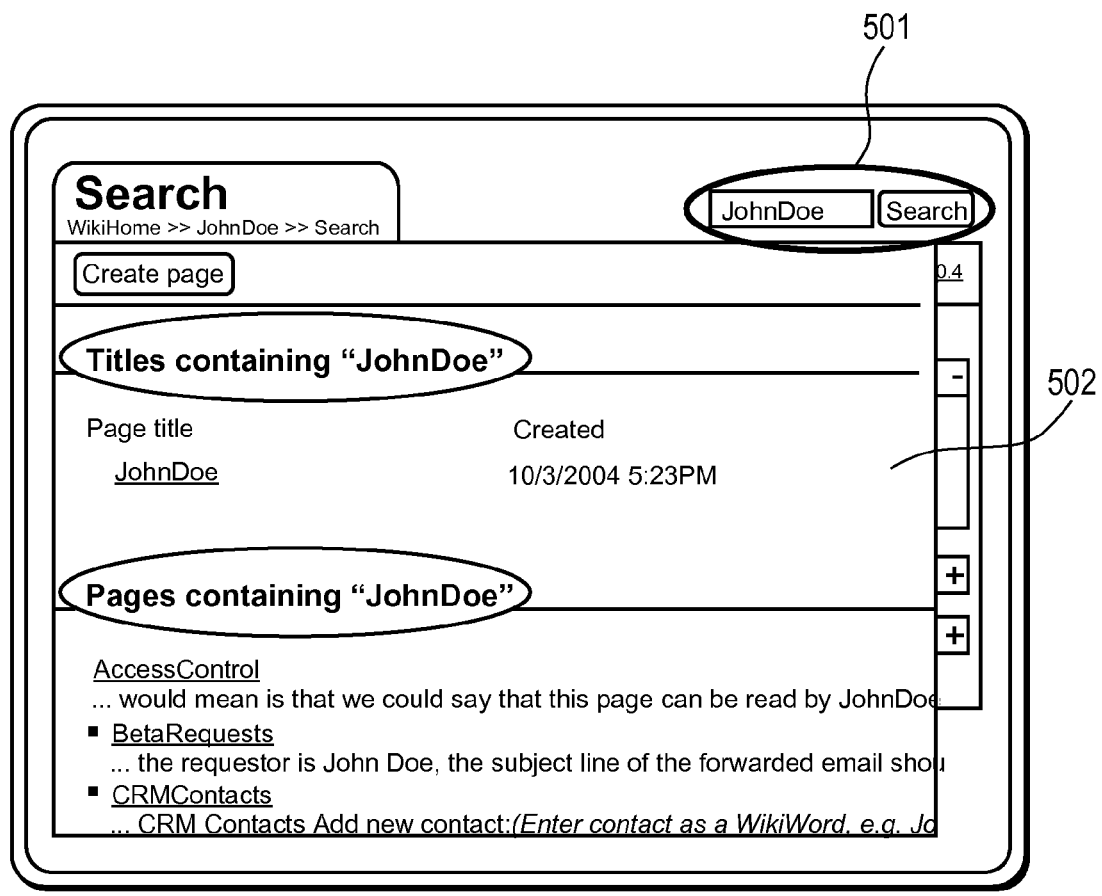
FIG. 5 is a screen shot depicting an example of a user interface for a search function within a user-editable website according to one embodiment of the present invention.

FIG. 5 is a screen shot depicting an example of a user interface for a search function within a user-editable website according to one embodiment of the present invention. The user types a query in field 501; results are shown in results area 502.

In one embodiment, all pages in the wiki are full-text indexed and searchable. In addition to (or instead of) editing pages, users can add comments if they wish. In one embodiment, the structured properties of each page can be searched in a structured way (in addition to full-text), for example with XPath or SQL.

Revision Control

Figure 6A:
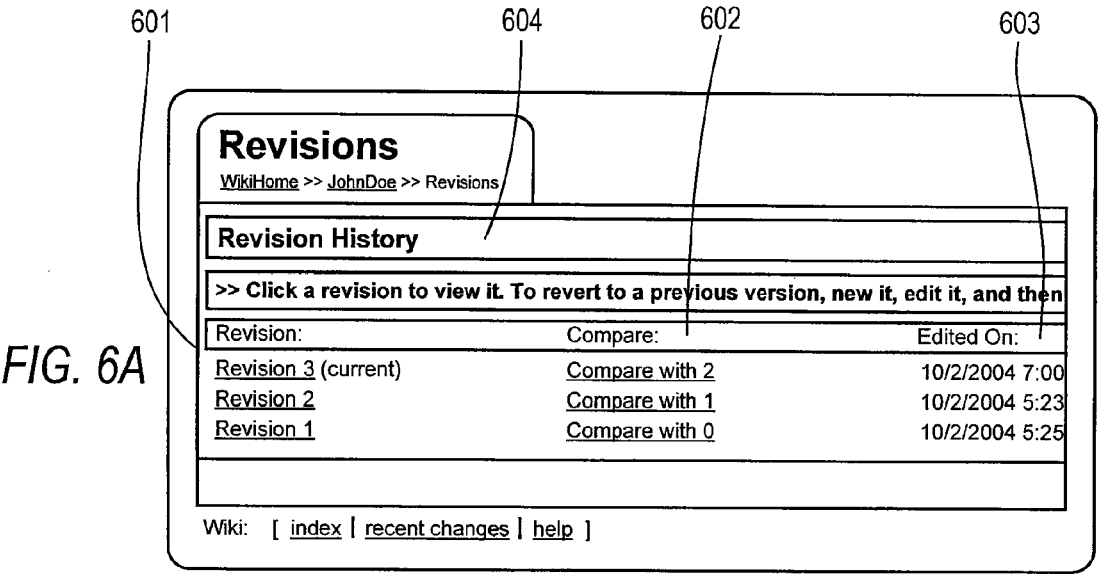
FIG. 6A is a screen shot depicting an example of a user interface for revision control within a user-editable website according to one embodiment of the present invention.

In one embodiment, the present invention also provides revision control. A user can "roll back" to any previous version or compare two versions. FIG. 6A is a screen shot depicting an example of a user interface for revision control within a user-editable website according to one embodiment of the present invention. Revision history 604 shows various revisions 602, links 602 to compare each revision with a previous revision, and edit dates 603.

Figure 6B:
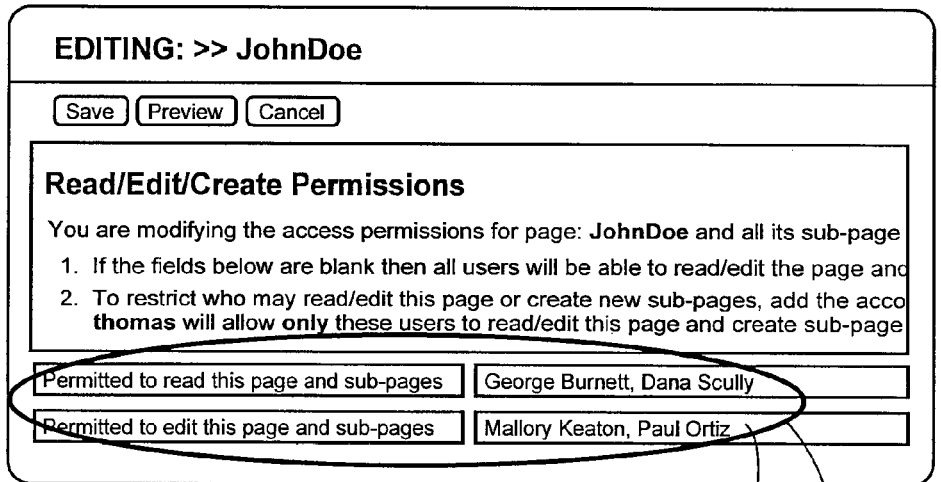
FIG. 6B is a screen shot depicting an example of a user interface for viewing permissions within a user-editable website according to one embodiment of the present invention.

In one embodiment, the present invention also provides permissions, to allow a user to specify who can read and write certain pages. FIG. 6B is a screen shot depicting an example of a user interface for viewing permissions within a user-editable website according to one embodiment of the present invention. In the example, list 605 shows individuals who have permission to read the page; list 606 shows individuals who have permission to edit the page.

Forms

In one embodiment, the present invention allows a user to add structure to wiki pages using forms. Using forms, the user can define fields to collect structured data like dates or numbers or create pull down menus to consolidate choices.

Figure 7:
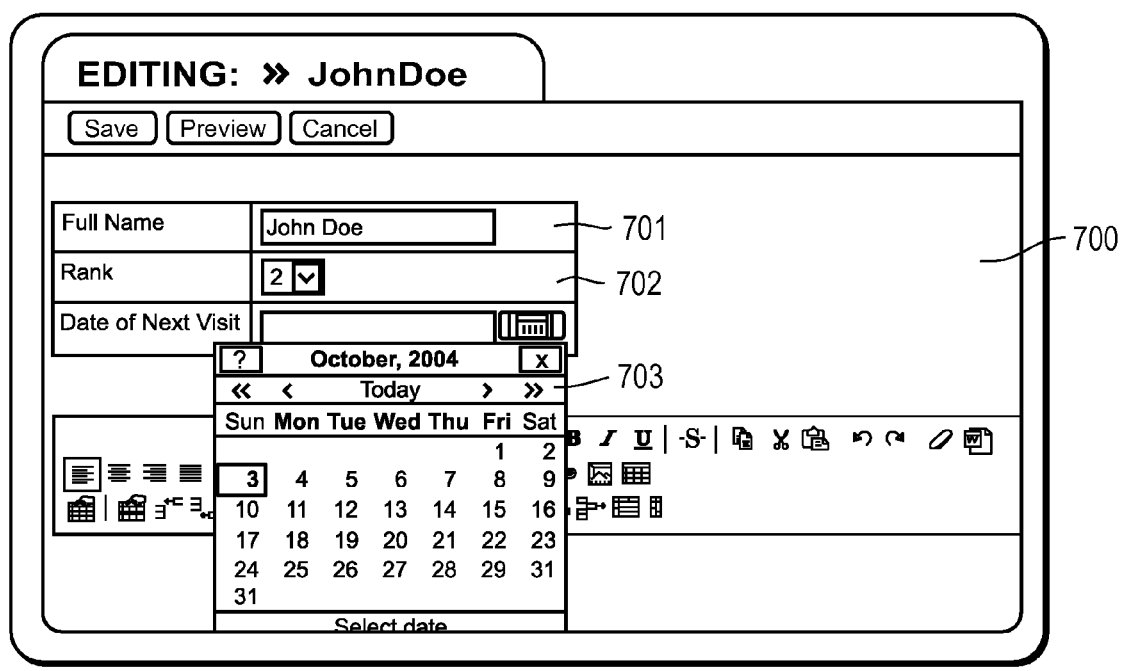
FIG. 7 is a screen shot depicting an example of a user interface for forms-based input within a user-editable website according to one embodiment of the present invention.

FIG. 7 is a screen shot depicting an example of a user interface 700 for forms-based input within a user-editable website according to one embodiment of the present invention. Field 701, pull-down menu 702, and calendar input interface 703 provide for structured forms-based input of data.

Forms need not be specified in advance. A user can start with a free-text wiki and then add structure later. Fields and forms can be added, modified or deleted at any time.

Tables & Calendars

Using the data collected through forms, the user can create dynamic tables.

Figure 8:
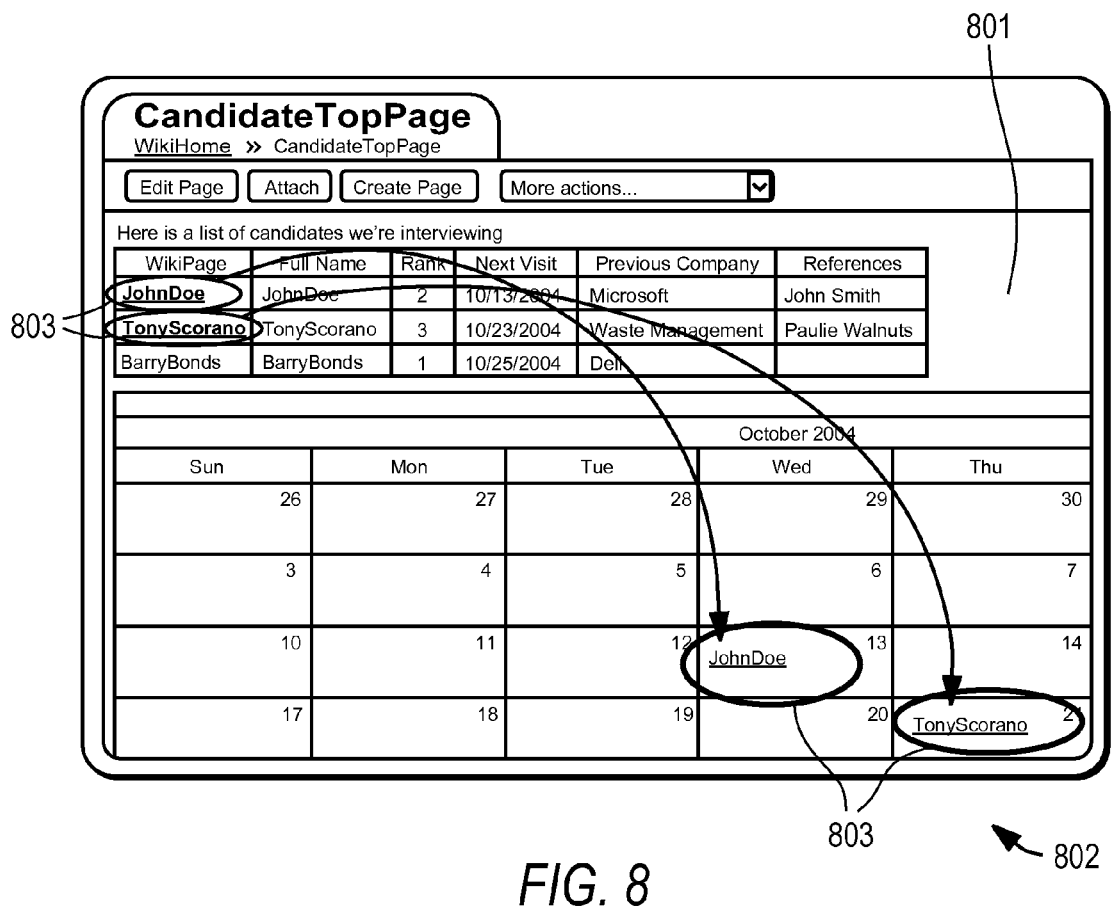
FIG. 8 is a screen shot depicting an example of a user interface for a table linked to a calendar within a user-editable website according to one embodiment of the present invention.

FIG. 8 is a screen shot depicting an example of a user interface including a table 801 linked to a calendar 802 within a user-editable website according to one embodiment of the present invention. In this example, table 801 shows all candidates, filtered to show only those of rank 2 or higher that have made it through the first interview. Calendar 802 displays the upcoming interview dates of all candidates.

Individual elements 803 can appear in both the table 801 and calendar 802 so that the viewer can clearly see the relationship between the two portions of the display.

Compositing Data

In one embodiment, the present invention is able to composite data from multiple web sources into a wiki.

Figure 9:
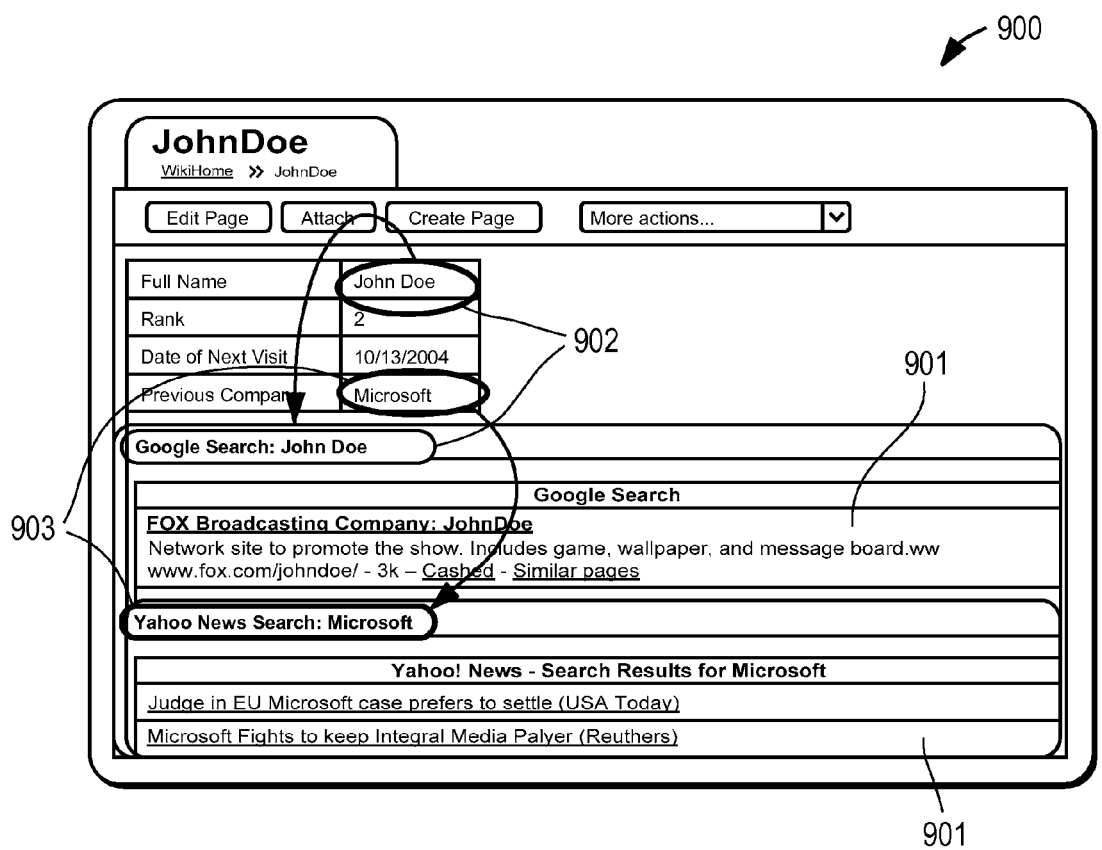
FIG. 9 is a screen shot depicting an example of a user interface for data composited into a web page within a user-editable website according to one embodiment of the present invention.

For example, FIG. 9 is a screen shot depicting an example of search results 901 composited into web page 900 within a user-editable website according to one embodiment of the present invention. Google search results can be embedded right into a page. That is, as shown in FIG. 9, for example, first data item "John Doe" 902 is used to generate a Google search result, while second data item "Microsoft" 903 is used to generate a Yahoo News Search. Page 900 dynamically looks up information on data items 902, 903 every time it is opened.

As another example, a custom news feed can be integrated into a page.

Application Platform

In one embodiment, the present invention provides an easy-to-use application platform that facilitates the creation of multi-user web applications in a very short period of time.

The present invention can be used to build highly customized collaborative applications. Such applications can easily be edited and modified. Applications can evolve over time and grow to perfectly fit a specific need.

Pages and Properties

The present invention uses a page as a fundamental unit of a wiki. Everything is stored as a wiki page. Themes (look and feel of the site), Forms, toolbars, user records, error pages—everything is stored using a single consistent model. Every page can be edited by anyone with permission. This means that practically everything can be customized and modified easily. The advantage of having a simple, consistent model for everything in the wiki is that a developer or user need only learn a few "verbs": view, create, edit, delete. Once he or she knows how to use those verbs, he or she can apply them to all of the artifacts of the system.

Pages have properties. A property is a value attached to a particular page. Each property has a name and a value. Furthermore, the value of a property has a specific type. For example, (almost) every page in the wiki has a property whose name is main/text and whose value is the text of the page. The type of main/text is usually wiki, which means that it is formatted wiki text.

Using the techniques of the present invention, a developer can create whatever properties are desired. For example, in a contact management application, a developer could create a contact/lastName property, a contact/firstName property, or the like. Property names look like path structures, but that is mostly for convenience in grouping similar properties together.

A page can have any number of arbitrary properties. Each property has a name (e.g. "contact/firstName"), a type (e.g. "text"), and an optional value (e.g. "John").

A property can be read, set, searched for, and reported on. Forms define groups of properties that get applied to all pages that the form is applied to.

In one embodiment, every page has a certain set of default properties with a defined meaning. For example:

main/text: The principal text of the page. This text is shown by the default WikiForm.
sys/template: The template for the page.
sys/templateAlternateView: The name of an alternate view template for the page, e.g. "blank" to use the blank template.
sys/form: The form for the page.
sys/childForm: The form for children of this page.
sys/readUsers: A list of users who have read access to this page. (If empty, all users have read access.)
sys/writeUsers: A list of users who have write access to this page. (If empty, all users have write access.)
sys/hidden: If set to "true", then this page will be excluded from normal searches.

A WikiForm is used to display and edit a subset of these properties. For example, the default WikiForm simply shows the main/text property; this is what users normally view and edit.

Most of the sys variables are inherited: a child will take on the value specified by their parent if the child doesn't explicitly specify a value itself.

In one embodiment, property names consist of at least two parts. Each part is separated by a "/". Usually, if the property is associated with a form, the first part of the name is the name of the form. For example, if there is a form named "contact", which contains a property called "firstName", the full name of the property will be "contact/firstName" when the form is applied to another page.

Figure 10:
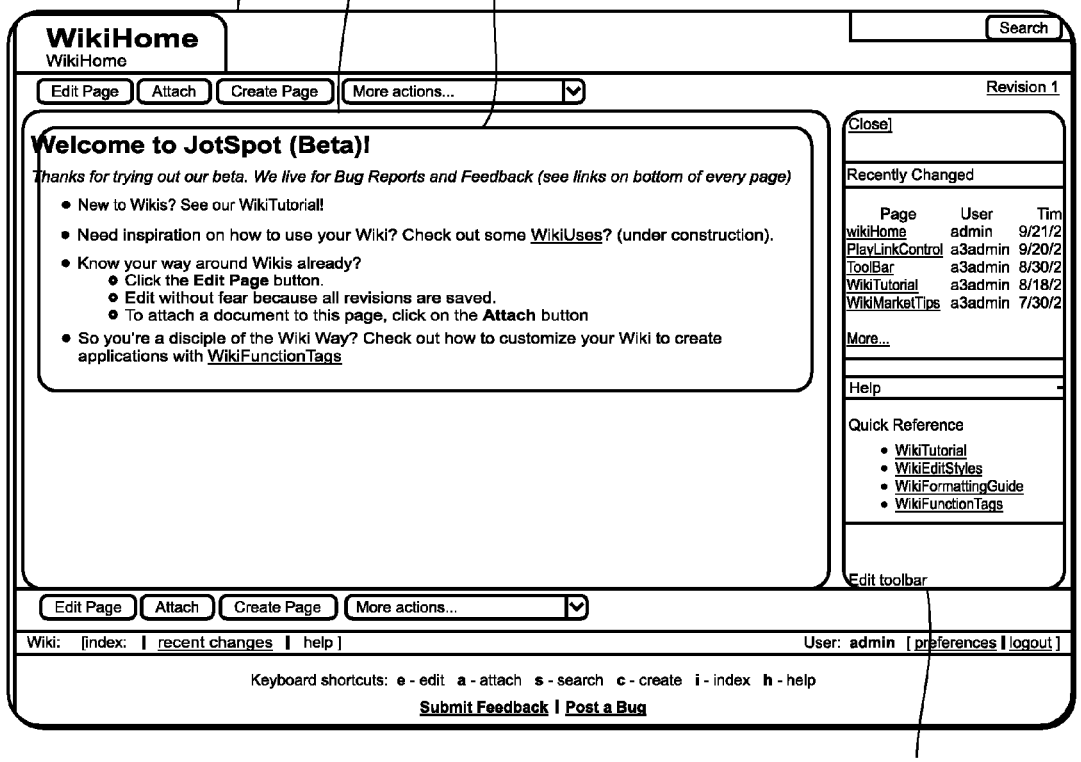
FIG. 10 is a screen shot depicting an example of a user interface for a theme, a form, a page, and a toolbar for a user-editable website according to one embodiment of the present invention.

In one embodiment, a page has a default theme and a default form. FIG. 10 is a screen shot depicting an example of a user interface for a theme 1000, a form 1001, a page 1002, and a toolbar 1003 for a user-editable website according to one embodiment of the present invention.

Theme 1000 defines the look and feel of page 1002: the WikiHome title, the Edit Page button, and the like. Form 1001 determines which properties to show; in this case, only the main/text property is displayed. The content inside page section 1002 is value of the main/text property. Toolbar section: 1003 is another wiki page included by the theme.

Forms and Structured Data

In one embodiment, forms allow users to enter structured data into the wiki and can easily be created with a few lines of script.

Forms are applied to a page. A particular form can be applied at different times to multiple pages, and the same page can have multiple forms applied to it. A form is best thought of as a ~dmask~ that chooses certain properties from the page it is applied to. In addition to choosing properties, it also determines how to show them on the page. Thus a form is a way to structure the properties of a page.

There are several ways to search, sort and filter data that has been entered into forms. Using the SearchTag and TableTag a user can easily search and display form data in a tabular format.

Themes

A theme is a set of pages in the wiki that define the "look and feel" of the page. A theme page can contain any combination of HTML or wiki script. The 'view' theme page is used when viewing a page; the 'edit' theme page is used when editing a page; and the 'preview' theme page is used when previewing.

Because a theme consists of a set of pages, a theme is typically defined by a ~prefix~. For example, the prefix '/System/Templates/single_tab/' defines a theme such that the 'view' page is located at '/System/Templates/single_tab/view', the 'edit' page is located at '/System/Templates/single_tab/edit', etc. A user can create and apply his or her own themes to a page.

A theme is usually specified by a path prefix. Given this prefix, the system looks for a particular template (e.g. the view template) by simply prepending the prefix. For example, given the prefix Templates/plain/, the system looks for the view template at Templates/plain/view.

In one embodiment, the prefix does not represent a directory; for example, if the prefix were MyTemplates/my, then the view template would be found at MyTemplates/myview. Therefore a trailing/character is included if the prefix specifies a directory.

In one embodiment, the following template types are expected by default:

view: Used for the normal viewing of a page.
edit: Used when editing a page.
preview: Used when previewing a page.
blank: Used for pages that are part of the interface, e.g. an index page or a view of past revisions. This template typically omits the edit and attach buttons. Note that the lack of an edit button does not mean that the page cannot be edited.

PageProperties can be used to change the template type; for example, if sys/templateAlternateView is set to foo and the prefix is Templates/plain/, then the view template will be Templates/plain/foo. This additional bit of complexity is useful for certain special cases, for example style sheets that should not have chrome.

Integrating Data from External Websites

In one embodiment, the present invention allows a developer to easily integrate data from external sites. The developer can include RSS feeds, as well as use the functions pre-built in a library to integrate data from other sites.

Action Modes

Every editable page in the wiki can be displayed in one of these modes: create, view, edit, or preview. The current mode can be obtained from the variable "action/mode".

View Mode Used to display a page, for instance if a user clicks a normal link. A wiki link will, per default, show a page in view mode.

Edit Mode: A page is displayed in Edit Mode if the user clicks the "Edit Page" button or if the link to a page contains the query parameter "edit" with value 1, e.g. "http://mywiki.jot.com/TestPage?edit=1".

Create Mode Whenever the user hits the "Create Page" button and types in the name for a new page, that new page will be displayed in Create Mode.

Preview Mode: A page is displayed in Preview Mode whenever the user edits or creates a page and then hits the "Preview" button.

Pages and Templates

The wiki relies on a particular layout for a variety of pages: templates, error pages, etc.

System Pages

Defaults: If attributes aren't found by looking up ancestors of a page, the Defaults page is consulted.

Errors/Generic: A generic error handler.

Errors/page: A specific error handler, e.g./Errors/NodeNotFound.

Forms/DefaultForm: The default form used to display wiki pages that don't otherwise specify a form.

Forms/SystemForm: (Optional) A form that shows a view of system-level properties for each page (e.g. read access, template, etc.)

Pages/Attach: The page that is shown when a user adds an attachment.

Pages/Login: The page that is shown when a user logs in.

Pages/Logout: The page that is shown when a user logs out.

User Authentication

Files inside_Admin/Users contain authentication information. For example, the authentication information for user foo is stored in_Admin/Users/foo. In one embodiment, these pages are expected to set a single PageProperty, user/password, which contains the encrypted password.

Scripting

In one embodiment, the present invention provides a scripting language for the application wiki. The scripting language enables the writing of "situated", lightweight wiki application, making use of XML markup and XPath expressions. Script tags "live" in the wiki namespace. In one embodiment, the present invention uses a language-neutral API called JotLib; JotLib is embedded in different scripting languages such as server-side Javascript, XML template processing, XPath, and others. It is also exposed to web-services protocols such as XML-RPC, SOAP, and the pseudo-protocol REST.

In one embodiment, the scripting language takes the following form:

<wiki:table form="ContactForm"/>

This example assumes that there is a WikiForm called contact, which is used for a simple contact database application. The line above simply generates a table of all contacts. Each row will show a contact and each column will show a property of the form.

The following script line would show all contacts in a given state:

```
All contacts in ${wantedState}:
    <wiki:search forFormName="contact" filter="contact/state ==
wanted-State" order="contact/lastName" />
    <wiki:table/>
```

This assumes that the wanted state has been assigned already to a variable called wantedState (this could come from a pull-down menu for instance). A SearchTag is used in order to find all contacts residing in the wanted state. The results are ordered by last name.

The following is a representative list of script tags:

a: HTML's A tag plus some additional features.
calendar: Provides a calendar view of a set of objects.
control: The control tag is an interface to creating several types of UI controls.
dumpvars: A debugging tag that inserts a comment into the page showing variables and their values.
ext: The ExtTag interfaces with external data sources.
filter: Allows the user to filter a collection of objects.
field/input: Declares an input field in the context of a wiki form.
form: Declares a wiki form.
if: A tag that displays its contents conditionally.
include: IncludeTag is typically used for building search results pages or other programmatic tasks.
indexlayout: Creates an index view of a search result.
loop: The loop tag iterates over the content of a variable and evaluates the data inside the loop once for each element.
miniWindow: Creates a collapsible mini-window.
nodeinfo: Binds a variable to a specific page (node) so you can then access specific properties of that page.
report: Create reports over pages in your wiki.
search: Search pages.
show: An improved version of the include tag.
showpath: Simplifies the display of navigational breadcrumbs.
summary: Display a summary of a given page.
switch: Chooses between alternatives and displays the alternative that matches.
table: Show data in tabular form.
toc: Produces Table of Contents from headlines.
var: Sets a variable.

XPath Expressions

Any text between ${ and } is evaluated as an XPath expression.

Often the expression will simply be a variable reference, e.g. ${req/path} or ${page/editTime}. However, the contents of ${ } can actually be any valid XPath expression.

Examples, assuming a has the value 10 and b has the value 20:

|'${a}'|10|
|'${a+20}'|30|
|'${a+b}'|30|
|'${a<b}'|true|

Structured Variables

XPath variables can have structure; for example, the req variable has a path child and an args child; the args child has its own children, which represent the query-string arguments.

Examples, assuming req/path has the value WikiHome:

Expression: Result ${req/path}: WikiHome ${concat(req/path, 'blah')}: WikiHomeblah?

Lists

XPath variables can also represent lists; for example, if page is bound to a node with attachments using the NodeInfoTag, then ${page/attachments} will represent an array:

Example: Meaning ${page/attachments[1]}: The first attachment (note that XPath numbers from 1, not from 0)

${count(page/attachments)}: The total number of attachments

Names Vs. Expressions

Usually an attribute will take an expression as its value. This expression can be anything: pure text (e.g. abc), a variable reference (e.g. ${req/path}), or something more complicated (e.g. ${count(page/attachments)}).

However, sometimes an attribute specifies the name of a variable. In this case, the attribute should only be the variable's name (e.g. req/path), not an expression containing the variable (e.g. ${req/path}). This is the case for the over attribute of the LoopTag, for example.

XPath Functions

Several custom functions are defined for XPath expressions in addition to the functions defined by XPath.

format:relativeTime(time): Shows a relative representation of the input time, e.g. "2 hours ago"

format:showSize(size): Shows a friendly representation of the input size, e.g. "17K"

format:integer(number): Shows an integer for any decimal value, e.g. "12" if "12.0" was passed in util:isDefined(value): Will return true or false depending on whether value is defined util:wikiwords(value): Splits a wikiword into its component parts; e.g. util:wikiwords('AaaBbb')[1] will equal Aaa.

util:showXML(value): If value is an XML element, this method shows the XML markup as text.

util:split(delimiter, strToSplit): Splits strToSplit into substrings using delimiter util:urlEncode(str): Encodes the string as a URL (e.g. substituting %xx for special characters)

util:webspaceURL(str): Converts str from a wiki-local path (e.g./Path) to a fully qualified URL path (e.g./mywebspace/Path).

util:emailAddress(pageName): Returns the inbox email address for any given page name string or page Functions are invoked inside curly braces following a $ sign.

Examples Include

Page was last edited at ${format:relativeTime(node/editTime)}

The attachment size is ${format:showSize(node/attachSize)}

The email address of this page is ${util:emailAddress{page}

Predefined Variables

These variables will typically be used with ${ } syntax; e.g. req/path is usually referenced in a template as ${req/path}.

The Request

The current wiki page plus any query string arguments constitute the "request", and that data is stored in the variable req. Req has the following subvariables:

req/path: The wiki page being requested, e.g. WikiHome.

req/args: The query string arguments.

req/user: The current user's name.

Examples, assuming the following query string: http://www.wikipad.com/webspace/Bugs/SomeBug?foo=FOO&bar=BAR req/path /Bugs/SomeBug req/args/foo FOO req/args/bar BAR The Action The action variable represents the current action that the user is taking. For example:

action/mode: Either create or edit, depending on whether the user is creating or editing the page. (Empty if the user is just viewing the page).

action/content: If the user is previewing a page, ${action/content} stores the data that they input on the edit page. This variable simply passes the content along to the save page.

action/editStyle: If the user has specified an edit style, this variable will contain its name.

action/createContext: Used to determine where a user was when they asked to create a page. Determines the created page's parent.

action/errorPage: The path of the page that triggered the error.

action/pageWanted: If the user is logging in, they are sent to the Login page and this variable stores the name of the page they wanted to access. If the user is visiting a page that doesn't exist, they are sent to the PageNotFound page and this variable stores the name of the page they were trying to create.

action/loginMessage: Displays the reason that the user is being sent to the login page. Usually this message simply says that the user is not authenticated.

System Variables

These variables are used by the system to exchange information between tags.

sys/form/prefix: Used by the FormTag to pass the current form name to the FormInputTag.

sys/form/classAttrFormat: Used to set the class attribute format sys/form/idAttrFormat: Used to set the id attribute format sys/debug/*: debug variables.

sys/error/*: error variables.

The NodeInfo Tag

The nodeinfo tag binds a variable to a specific node so that the user can then access specific properties of that node. The user can bind any node to a variable, not just the node that the user is currently visiting.

Attributes:

path, href, node, revision: see Default Path Attributes below name: the name of the variable to set Properties:

Once a node has been bound, the following sub-variables can be accessed:

path: The path to the node
    href: The full absolute path to the node
    name: The node's name (the leaf of the path)
    revision: The node's revision
    id: The node's id
    user: The user who most recently edited the node
    time; Shows when the node was edited, e.g. "Nov. 22, 2003 9:43 pm"
    editTime: same as time
    modificationTime: Shows when the node was uploaded. This might differ from the time if the node was uploaded from a file, in which case the file's edit time will be supplied for time and the time of upload will be supplied for modificationTime.
    createTime: Shows when the file was created
    data: Allows access to WikiForms, e.g. data/contact/firstName will access the firstName key in the contact partition.
    attachments: An XPath array whose contents are the attachments for the node. Undefined if the node has no attachments.

Attachment Properties:

The result of the attachments property is another list of nodes. For each element in attachments, the above properties are valid; for example, name is the name of the attached file.

The following additional properties are also defined for attachments:

comment: A user-specified comment added when the file was uploaded.
    contentType: The MIME-type of the content.
    attachSize: The size of the attachment.
    imageURI: The href of the icon representing this attachment.

EXAMPLE(S)

<wiki:nodeinfo name="page" href="wiki:${req/path}"/>

Then to display the values of any of the sub-variables associated the node specified, the following syntax can be used:

${page/name}—Page's name
    ${page/time}—When the page was edited

DefaultPathAttributes

There is a set of default attributes that are used by several tags (e.g. NodeInfoTag, IncludeTag, ShowTag). These attributes provide different ways to access a node.

path: The text of this attribute names a node's path.
    href: The text of this attribute is a wiki:/Path path.
    node: The attribute is an XPath expression that references a node
    revision: If specified, the named revision is fetched. If not specified, the most recent revision is used.

In one embodiment, one of path, href, or node must be specified. The only difference between path and href is that href expects the link to have a wiki: prefix. In other words, the following two invocations are the same:

<<show path="/Wiki/Path">>
    <<show href="wiki:/Wiki/Path">>

Packages and Applications

A package is a bundle of wiki pages described by a manifest. It can be downloaded, distributed, and installed in any wiki as a ZIP file.

Packages can be used for several purposes. Mostly they will be used to bundle up wiki applications. Packages can also be used to define themes ("skins") for the wiki. Packages can be used to bundle up system pages that will get deployed to new wikis.

Manifest Structure

A package is composed of a number of pages that are described by a manifest. The manifest contains information about the paths and types of pages that are included in the package. It also contains information about the name of the package, its author, version, etc. In one embodiment, the manifest itself is another wiki page, having the following properties:

User-Editable Properties:

main/text (wiki): Contains a table with a well-defined structure (see "The Content Table" below), which lists all pages and their types.
    package/name (text): The name of the package. The manifest will get created as a new page with the package name as a sub-page of /System/Packages when the package gets installed.
    package/version (text): The version of the package. This can be an arbitrary string and is used by JotSpot to prevent users from installing the same package twice with the same version.
    package/author (text): (Optional) The name and/or URL of the creator and/or owner of this package.
    package/license (wiki): (Optional) Contains the distribution/usage license for this package.
    package/homePage (text): (Optional) The package home page path. The home page is in most cases part of the package. The package installer will display it after the package was installed successfully. The path should be absolute (start with a '/' character), e.g. '/MyPackageHomePage' or '/MyApp/HomePage'.
    package/type (text): Contains the type of the package. Can be either 'Application', 'Theme', or 'System' (reserved for packages created by JotSpot). The most common type of package is the 'Application' package. The package type is currently only used for sorting packages into different categories. As an example the "Installed Applications" box in a toolbar should show only packages of type 'Application'.

System-Controlled Properties:

package/signature (text): A digital signature of the whole package. This is calculated by the system in order to understand when a package has been altered.
    package/created (text): (Installed packages only) The time when the package was created (zipped) in milliseconds since 1970.
    package/installed (text): (Installed packages only) The time when the package was installed.
    package/privateContents (wiki): System-generated table mirroring the contents table adding some additional information, such as signatures for pages that are part of the package.

The Contents Table

The main/text property of the package manifest describes which pages are part of the package in the form of a normal HTML table. The table has a structure as shown in this example:

WikiHome (app): This is the home page
    AnotherPage? (app): Another part of my package
    MyAppConfig? (conf): A configuration page Creating Packages and Applications The system package PackageUserInterface, which is installed in the wiki, supports the developer in creating new manifests and packages./System/Packages is the home page of this package.

Date Functions
  date:now( ) Returns today's date.
  date:before(d1, d2) True if d1 occurs before (or is the same as) d2.
  date:after(d1, d2) True if d1 occurs after (or is the same as) d2.
  date:create(str) Parses str as a date specification and returns a date object.
  date:dayBegin(d) Returns a new date that corresponds to 12:00 am on the same day as d. For example, date:dayBegin(date:now( )) will return 12:00 am today.
  date:addDays(d, n) Adds n days to d. n can be negative.
  date:sameDay(d1, d2) Returns true if the two dates refer to the same day (regardless of their hour/minute/second settings).
Date Objects
  Date objects can be displayed as-is—e.g. ${date}—to display their value. The following date objects are also available:
  date/date returns just the year/month/day
  date/relative the relative age of the date (e.g. "5 minutes ago")
  date/full the full (long) form of the date
  date/local the date shown in the local time zone, regardless of the time zone in which the date was created.
  date/mdy same as date/date
  date/year Year number
  date/month Month number, starting at 1
  date/monthName Full name of month
  date/day Day of month, starting at 1
  date/dayName Day name, e.g. "Monday"
Dates and Forms
  The date type of wiki:input can be used to create a new year/month/day date (in other words, no time of day), or datetime can be used to create a full date/time pair.
Defaults
  The default time zone used for showing and editing dates is stored in the variable sys/env/timeZone. The value can be changed to a string (e.g. "EST"), and all future dates will be shown using that time zone.
  The user can also modify sys/env/formatTime, sys/env/formatDate, and sys/env/formatTimeDate to control the display of times and dates.

Example 1

Creating Forms 1—Simple Contact Manager

Forms are a great way to be able to create structured data in a Wiki. In this example a simple contact management database is created that allows a user to enter new contacts via a form with custom fields at the push of a button. This contact manager works best when the user enter new contacts as WikiWords.

The developer creates a page in a wiki that will be the "home" for the contact management app. For the purposes of this example, that page is referred to as "MyContacts". The developer hits the "Create Page" button, and on the next screen he or she titles the page "MyContacts".

On the MyContacts page, the developer creates a createPage control that will allows him or her to easily add new contacts to the contact database. In one embodiment, every new contact that the developer creates is essentially its own page in the Wiki.

The createPage control allows the developer to enter new contacts. On the MyContacts page, the developer enters the code below:

Enter new contact:
  <wiki:control type="createPage" default Form="ContactForm" label="Go"/>
Next the developer adds some code to search for all the contacts and display them in a table.
My Contacts:
  <wiki:table form="ContactForm"/>
FIG. 11 is an example of a resulting contact manager screen 1100 within a user-editable website according to one embodiment of the present invention, including field 1101 for entering a new contact.

The developer creates the ContactForm page by hitting the "Create Page" button, entering ContactForm in the box, and then entering the following code on the new page:

```
<wiki:form name="contact">
| First: | <wiki:field name="firstName" /> |
| Last: | <wiki:field name="lastName" /> |
| Phone: | <wiki:field name="phone" /> |
| State: | <wiki:field name="state" /> |
</wiki:form>
```

In the code above, a form is started and titled "contacts". The bars separating the text are wiki tables that allow the developer to display his or her form fields in organized rows and cells.

Figure 12:
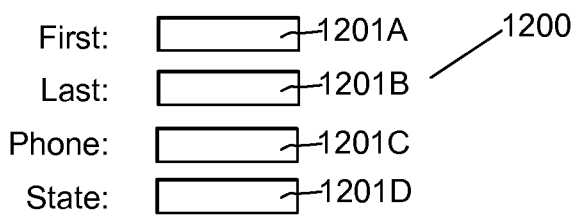
FIG. 12 is an example of a contact form within a user-editable website according to one embodiment of the present invention.

FIG. 12 is an example of a resulting contact form 1200 within a user-editable website according to one embodiment of the present invention, including fields 1201A, 1201B, 1201C, and 1201D for entering data about a contact.

A user can now enter new contacts into the Contact Management database, by going to the MyContacts page and entering a new contact.

After entering a new contact as a WikiWord, the form asks the user to enter a first name and last name. The following change avoids the need for duplicative entry of this information. Namely, by changing:

```
| First: | <wiki:field name="firstName" /> |
| Last: | <wiki:field name="lastName" /> |
``` to this:

```
| First: | <wiki:field name="firstName" value="${util:wikiwords(page/name)[1]}"/> |
| Last: | <wiki:field name="lastName" value="${util:wikiwords(page/name)[2]}"/> |
```

The developer makes use of a utility called util:wikiwords to split a WikiWord into two pieces, and then setting the default values of the firstName and lastName fields to be first and second pieces of the WikiWord, respectively.

Example 2

Creating Forms 2—Automatically Numbered Pages

FIG. 13 is an example of a call log summary 1300 within a user-editable website according to one embodiment of the present invention. The purpose of this example is to make a form that will allow a user to create pages that are automatically titled and numbered.

For example, suppose it is desired to create a Daily Calls Log. The purpose of this log is to have a page where a user can hit a button 1301 and fill in a simple form with some basic information about a call that has been received. Each logged new call creates a page in the user's wiki, and the title of the page will be automatically created, which will be its unique ID. The user will be able to choose how pages are named, and every new call he or she enters will have that name with a number added to the end of it. In this example, new pages are named DailyCall. The user has the ability to set the page title. An incremented number will automatically be added to the end of each page title when a new call is added (example: DailyCall0, DailyCall1, DailyCall2, and so on . . . ).

The user wants to know:
Who made the call
Who answered the call
Who the call was for
Date/time of the call
Summary of the call
Actions that need to be taken as a result of the call
Additional notes/comments about the call The developer uses the createPage control to create button 1301 that will allows a user to enter new calls. The developer changes his or her Default Edit Style setting by clicking on a Preferences link, clicking "Edit Page", and then changing the "Default Edit Style" setting to Script Markup. The developer saves the page, and goes back to the WikiHome page by clicking the WikiHome link at the top left-hand corner of the page inside the tab. Now the developer hits the "Create Page" button and on the next screen titles the page "DailyCallsLog".

The developer pastes in the createPage control:

```
<wiki:control type="createPage"
    defaultForm="DailyCallsLogForm"name="NewCall"
    label="Enter New Call" />
```

Next, the developer adds some code to search for all the calls entered and display them in a table.

Daily Calls:
<wiki:table form="DailyCallsLogForm"/>

This tells the table tag to "look up all the pages created using the DailyCallsLogForm, and display them in a table". So the actual search for the pages is implicit.

Now the developer creates the DailyCallsLogForm to specify what fields he or she wants to capture when entering a new call. Since it doesn't exist yet, the developer creates it now by hitting the "Create Page" button, entering DailyCallsLogForm as the title of the page, and then entering the following code on the new page:

```
!Call Details
    <wiki:form name="CallLog">
    <wiki:input type="pageName" uniquePattern="DailyCall%U" />
    | Caller: | <wiki:field name="caller" /> |
    | Recipient: | <wiki:field name="recipient" /> |
    | Answered By: | <wiki:field name="answeredBy" /> |
    | Date/Time: | <wiki:field type="datetime" name="date" /> |
    | Summary: | <wiki:field name="summary" /> |
    | Action needed: | <wiki:field name="action"
selectOptions="None, Call Back, Send Email" /> |
    Notes/Comments:
    <wiki:field name="main/text" type="wiki" />
    </wiki:form>
```

The code above starts a form and titles it "CallLog". The bars separating the text are wiki tables that allow the developer to display form fields in organized rows and cells.

Note the following code in the above sample code:

<wiki:input type="pageName" uniquePattern="DailyCall%U"/>

This is where the developer defines the naming scheme for each new page that is created. The unique name pattern "DailyCall%U" is used, where the %U means "add a uniquely incrementing number". So the result is DailyCall0, DailyCall1, DailyCall2, etc. To see what other types of patterns the developer can use, see the PageNameField documentation page.

Figure 14:
FIG. 14 is an example of a call log form within a user-editable website according to one embodiment of the present invention.

FIG. 14 is an example of a resulting call log form 1401 according to one embodiment.

The user can now enter new calls into the Daily Calls Log by hitting the "Enter New Call" button 1301 as shown in FIG. 13, which causes form 1401 to appear. As the user enters calls, the calls will appear in the table on the DailyCallsLog page. Each call has a new number at the end of its name.

The developer can also add a calendar to go along with the log, so that the user can automatically chart the calls that are received in a convenient monthly calendar view. The following line is added to the DailyCallsLog page:

<wiki:calendar form="DailyCallsLogForm"/>

The developer can create a calendar and feed into it all the pages that were created through the DailyCallsLogForm page. It will use the first date field type that it comes across in the form that is defined to determine where to place each call on the calendar.

Example 3

Calendar

FIG. 15 is an example of a calendar 1501 including structured data. The developer creates a form to enter some events, and then displays those events in a calendar.

The developer creates a page calls it CalendarForm. The developer sets the event_date field shown below to type="date", and gives it a name of "event_date":

```
<wiki:form name="event">
    <wiki:input type="pageName" uniquePattern="Event%U" />
    | Title: | <wiki:field name="title" /> |
    | Location: | <wiki:field name="location" /> |
    | Date: | <wiki:field name="event_date" type="date" /> |
</wiki:form>
```

Now that the developer has created a CalendarForm, he or she creates a new page called MyCalendar. This is the page to be used to display the calendar as well as the "Create new event" button. The developer enters this line in the MyCalendar page:

```
<wiki:control type="createPage" name="NewEvent" default-
    Form="CalendarForm" label="Create event" />
```

The next step is to do a search to collect all the pages that were created by using the form before feeding them into the calendar. Remember that we named the wiki:form 'event' in an earlier step:

```
<wiki:search forFormName="event" />
```

Now the pages can be displayed in a calendar view 1501 as shown in FIG. 15.

Example 4

Advanced Calendar

FIG. 16 is an example of an advanced calendar 1601 within a user-editable website according to one embodiment of the present invention. This example shows a way to display events and meetings that are scheduled for a particular date and time or span across multiple days.

The developer creates a page and calls it CalendarForm.
The developer sets the event_date field shown below to type="datetime".

```
<wiki:form name="event">
    <wiki:input type="pageName" uniquePattern="Event%U" />
    | Title: | <wiki:field name="title" /> |
    | Location: | <wiki:field name="location" /> |
    | Date: | <wiki:field name="event_date" type="datetime" /> |
</wiki:form>
```

Now the developer creates a new page called MyCalendar. This is the page that will be used to display the calendar as well as the "Create new event" button. The developer enters this line below in the MyCalendar page:

```
<wiki:control type="createPage" name="NewEvent" default-
Form="CalendarForm" label="Create event" />
```

The developer can specify the date as well as the time of the event when he or she creates a new event.

The next step is to do a search to collect all the pages that were created by using the CalendarForm before feeding them into the calendar. The wiki:form has been named 'event' in an earlier step:

```
<wiki:search forFormName="event" />
```

The pages are then displayed in a calendar view 1601.

```
<wiki:calendar property="event/event_date">
    <wiki:item>
        [[${it}][${it/event/title}]]
        ${it/event/event_date/time}
        ${it/event/location}
    </wiki:item>
</wiki:calendar>
```

Using the wiki:item tags in between the wiki:calendar tags gives the developer fine grain control of what to display on calendar 1601. The developer can use XPathExpressions to display specific fields of the event. In the example above, the code displays various bits of information about the event including title, location and time.

Example 5

Events that Span Multiple Dates

In order to enter events that span multiple dates or events that recur on a periodic basis (e.g. Monthly team meeting), the developer can use the event-type field.

In the CalendarForm the developer replaces the datetime field with an event field.

```
<wiki:form name="event">
    <wiki:input type="pageName" uniquePattern="Event%U" />
    | Title: | <wiki:field name="title" /> |
    | Location: | <wiki:field name="location" /> |
    | Date: | <wiki:field name="event_date" type="event" /> |
</wiki:form>
```

The user will now be able to enter events that span multiple days.

Example 6

Searches and Tables

Searches and Tables go hand in hand. Searches are used to group or collect a set of wiki pages based on certain criteria. Tables display the data collected in the search.

1. forChildren forChildren is used to search for all the sub-pages (or 'children') of a parent page. This is what's called a parent/child relationship. For example:
NHLHockey
SanJoseSharks
NewYorkRangers
TorontoMapleLeafs
NBABasketball
GoldenStateWarriors
LosAngelesLakers
ChicagoBulls In this example, NHLHockey and NBABasketball are both parent pages with sub-pages (or children), beneath them. Let's say we only want to search for the Hockey teams. We know that they are sub-pages of the parent page called "NHL-Hockey". This is how the search would look:

```
<wiki:search forChildren="/NHLHockey" />
<wiki:table />
```

Let's see this code in action:

| WikiPage | Revision | User | Last Edited |
|---|---|---|---|
| NewYorkRangers | 1 | JotSpot | 10/15/2004 1:52 AM |
| SanJoseSharks | 3 | JotSpot | 10/15/2004 1:52 AM |
| TorontoMapleLeafs | 1 | JotSpot | 10/15/2004 1:53 AM |

Those two lines do the following: first search for all sub-pages of NHLHockey, and then throw the results in a table to display them. Notice that in this example we simply used <wiki:table/> with no other arguments.

Here's the way that search tags and table tags know how to work with each other: In the search tag example above, notice that we have not set any kind of variable to store the results of the search in. The search above is just the search tag with only forChildren specified. In the case where the developer does not specify set="anyVariableName" in the search tag, the results of the search will be stored in an internal variable that is hidden to the user. Any table tags that are used after the search will seamlessly use that hidden variable. Alternatively, the developer can also manually choose a variable name. Here's an example of explicitly setting a variable for the results of the search: <wiki:search forChildren="/NHL-Hockey" set="nhlResults"/>

This means that the results of the search are now stored in a container called "nhlResults". In the table tag that follows, the developer specifies what container of search results the user wants to display, like so:
<wiki:table contents="nhlResults"/>

2. forFormName forFormName is used to retrieve all the pages that were created by using a specific form. Three contacts have been entered using a form.

```
<wiki:search forFormName="contact" />
<wiki:table form="ContactForm" />
```

The code above assumes a page somewhere with a wiki form on it that is titled "contact".

| WikiPage | FirstName | LastName | Phone | State |
|---|---|---|---|---|
| Steve | Steve | Foster | 99991111 | CA |
| EricYoon | Eric | Yoon | 6463352197 | NY |
| JaneSmith | Jane | Smith | 415-786-7865 | |
| SuzyFlint | Suzy | Flint | 310-940-9483 | California |
| SteveMcQueen | Steve | McQueen | 716-555-1212 | Indiana |
| JakeTurner | Jake | Turner | 555-385-1911 | Texas |
| BongiBen | Ben | Scott | 0141 959 8218 | UK |
| MaryJones | Mary | Jones | 650-483-9494 | California |
| HarryFlint | Harry | Flint | 310-940-9483 | California |
| WolfieLo | Artura | Lobo | 555-5555 | NC |

When the developer specifies the form page in the table tag, it displays all of the form fields in the generated table. Suppose the developer only wants to show the name of the page and the phone number associated with it, but would like to suppress the other fields. The search tag stays the same, but the table tag is modified:

```
<wiki:search forFormName="contact" />
<wiki:table>
<wiki:column prop="name" />
<wiki:column prop="contact/phone" />
</wiki:table>
```

Here is what is shown on the page:

| Name | Phone |
|---|---|
| Steve | 99991111 |
| EricYoon | 6463352197 |
| JaneSmith | 415-786-7865 |
| SuzyFlint | 310-940-9483 |
| SteveMcQueen | 716-555-1212 |
| JakeTurner | 555-385-1911 |
| BongiBen | 0141 959 8218 |

-continued

| Name | Phone |
|---|---|
| MaryJones | 650-483-9494 |
| HarryFlint | 310-940-9483 |
| WolfieLo | 555-5555 |

3. forName forName is used to specify a search pattern for matching the names of pages in a wiki. The * symbol can be used as a wildcard. If no wildcards are specified, the match implicitly adds wildcards to the beginning and end so that the pattern "foo" will match "afoob".

As an example, let's say we want to find all pages with the word "Home" in them:

```
<wiki:search forName="Home" />
<wiki:table />
```

This is the result:

| WikiPage | Revision | User | Last Edited |
|---|---|---|---|
| AlbertoHome | 1 | mailbot | 11/21/2004 5:41 AM |
| WikiHome | 37 | jotspot_scott | 1/24/2005 11:02 AM |
| TutorialHome | 3 | s3admin | 10/13/2004 2:46 AM |

Example 7

Search Filters & Sort Order

The following example shows a technique for refining search results by using filters. A search filter is an instruction given to the search tag telling it to match the results against specific criteria. For example, use the same contact list created above, a regular search and table shows all the contacts currently in the database:

```
<wiki:search forFormName="contact" />
<wiki:table form="ContactForm" />
```

| WikiPage | FirstName | LastName | Phone | State |
|---|---|---|---|---|
| Steve | Steve | Foster | 99991111 | CA |
| EricYoon | Eric | Yoon | 6463352197 | NY |
| JaneSmith | Jane | Smith | 415-786-7865 | |
| SuzyFlint | Suzy | Flint | 310-940-9483 | California |
| SteveMcQueen | Steve | McQueen | 716-555-1212 | Indiana |
| JakeTurner | Jake | Turner | 555-385-1911 | Texas |
| BongiBen | Ben | Scott | 0141 959 8218 | UK |
| MaryJones | Mary | Jones | 650-483-9494 | California |
| HarryFlint | Harry | Flint | 310-940-9483 | California |
| WolfieLo | Artura | Lobo | 555-5555 | NC |

Now, suppose we only want to display the contacts that live in California. A filter can be applied, as follows:

```
<wiki:search forFormName="contact" filter="it/contact/state =
 'California'" />
<wiki:table form="ContactForm" />
```

| WikiPage | FirstName | LastName | Phone | State |
|---|---|---|---|---|
| SuzyFlint | Suzy | Flint | 310-940-9483 | California |
| MaryJones | Mary | Jones | 650-483-9494 | California |
| HarryFlint | Harry | Flint | 310-940-9483 | California |

The filter="it/contact/state='California'" was added to the search. The "it" stands for "iterator", namely an object or routine for accessing items from a list or array, one at a time. The iterator loops over a number of items.

So now the search tag does the following:
  Searching for all pages that were created using the form named "contact"
  For each item in the list that was generated, make sure the state field is equal to 'California'

Another example is now shown, in which the desired result is to retrieve all of the contacts that are NOT from Indiana.

```
<wiki:search forFormName="contact" filter="it/contact/state !=
 'Indiana'" />
<wiki:table form="ContactForm" />
```

| WikiPage | FirstName | LastName | Phone | State |
|---|---|---|---|---|
| Steve | Steve | Foster | 99991111 | CA |
| EricYoon | Eric | Yoon | 6463352197 | NY |
| JaneSmith | Jane | Smith | 415-786-7865 | |
| SuzyFlint | Suzy | Flint | 310-940-9483 | California |
| JakeTurner | Jake | Turner | 555-385-1911 | Texas |
| BongiBen | Ben | Scott | 0141 959 8218 | UK |
| MaryJones | Mary | Jones | 650-483-9494 | California |
| HarryFlint | Harry | Flint | 310-940-9483 | California |
| WolfieLo | Artura | Lobo | 555-5555 | NC |

Another example is now shown, in which the desired result is to retrieve all of the contacts with the last name of "Flint" that live in California.

```
<wiki:search forFormName="contact" filter="it/contact/state =
 'California' and it/contact/lastName = 'Flint'" />
<wiki:table form="ContactForm" />
```

| WikiPage | FirstName | LastName | Phone | State |
|---|---|---|---|---|
| SuzyFlint | Suzy | Flint | 310-940-9483 | California |
| HarryFlint | Harry | Flint | 310-940-9483 | California |

In one embodiment, the invention can also function in connection with XPath functions that allow greater flexibility when creating filters. For example, to filter for contacts that have an area code of 310 an XPath function "starts-with" can be used:

```
<wiki:search forFormName="contact" filter="starts-
with (it/contact/phone, '310')" />
<wiki:table form="ContactForm" />
```

| WikiPage | FirstName | LastName | Phone | State |
|---|---|---|---|---|
| SuzyFlint | Suzy | Flint | 310-940-9483 | California |
| HarryFlint | Harry | Flint | 310-940-9483 | California |

Example 8

Sort Order

The developer also has the option of specifying the order in which the results will appear. To show contacts alphabetically by last name:

```
<wiki:search forFormName="contact" order="contact/lastName" />
<wiki:table form="ContactForm" />
```

| WikiPage | FirstName | LastName | Phone | State |
|---|---|---|---|---|
| SuzyFlint | Suzy | Flint | 310-940-9483 | California |
| HarryFlint | Harry | Flint | 310-940-9483 | California |
| Steve | Steve | Foster | 99991111 | CA |
| MaryJones | Mary | Jones | 650-483-9494 | California |
| WolfieLo | Artura | Lobo | 555-5555 | NC |
| SteveMcQueen | Steve | McQueen | 716-555-1212 | Indiana |
| BongiBen | Ben | Scott | 0141 959 8218 | UK |
| JaneSmith | Jane | Smith | 415-786-7865 | |
| JakeTurner | Jake | Turner | 555-385-1911 | Texas |
| EricYoon | Eric | Yoon | 6463352197 | NY |

The default ordering style is in ascending order. The developer can also specify descending order by simply adding a - after the order:

```
<wiki:search forFormName="contact" order="contact/lastName-" />
<wiki:table form="ContactForm" />
```

| WikiPage | FirstName | LastName | Phone | State |
|---|---|---|---|---|
| EricYoon | Eric | Yoon | 6463352197 | NY |
| JakeTurner | Jake | Turner | 555-385-1911 | Texas |
| JaneSmith | Jane | Smith | 415-786-7865 | |
| BongiBen | Ben | Scott | 0141 959 8218 | UK |
| SteveMcQueen | Steve | McQueen | 716-555-1212 | Indiana |
| WolfieLo | Artura | Lobo | 555-5555 | NC |
| MaryJones | Mary | Jones | 650-483-9494 | California |
| Steve | Steve | Foster | 99991111 | CA |
| SuzyFlint | Suzy | Flint | 310-940-9483 | California |
| HarryFlint | Harry | Flint | 310-940-9483 | California |

Example 9

Search Box

In one embodiment, XML mode can be used to combine "raw" XHTML with a script to create a Search box that displays the results of the search in a collapsible window.

```
<html xmlns="http://www.w3.org/1999/xhtml"
xmlns:jot="http://www.foopee.com/ns/s3/srvtmpl/">
<form name="mysearch" method="get">
Search Google: <input name="search" />
<input type="submit" value="Go" />
</form>
<jot:include path="/Lip/Ext/GoogleSearch" search="${req/args/search}"
display="open" />
</html>
```

Example 10

Include Tags

In one embodiment, an IncludeTag can be used to allow easy inclusion of the contents of one wiki page into another wiki page.

Step 1: Create a MyCandidates page that has a createPage control for the CandidateForm. Switch the Default Edit Style setting to Script Markup by clicking on the Preferences link present on the bottom right hand corner of your page.

```
Enter new candidate:
<wiki:control type="createPage" defaultForm="CandidateForm"
label="Go" />
```

Create a page called CandidateForm and enter the following code.

```
<wiki:form name="candidate">
| Position: | <wiki:field name="position" /> |
| Name: | <wiki:field name="name" /> |
| Email: | <wiki:field name="email" /> |
| Phone: | <wiki:field name="phone" /> |
| Current Company: | <wiki:field name="company" />|
| Interview Status: |<wiki:field name="status" selectOptions="Open,
In-Progress, Rejected, Extended, Accepted" /> |
Notes/Comments:
<wiki:field name="main/text" type="wiki" />
</wiki:form>
```

Enter candidates from the MyCandidates page.

Step 2: Next step is to create a page that displays a table of all candidates. Create a page called CandidateSearchTable and enter the following code.

```
<wiki:search forFormName="candidate" order="time-"/>
<wiki:table>
<wiki:column header="ID #">
*[[wiki:${it/path}][${it/name}]]*
</wiki:column>
<wiki:column prop="candidate/position" header="Position" />
<wiki:column header="Status" sort="candidate/status">
*${it/data/candidate/status}*
</wiki:column>
<wiki:column prop="candidate/phone" header="Phone" />
<wiki:column prop="candidate/email" header="Email" />
<wiki:column prop="candidate/company" header="Current Company" />
</wiki:table>
```

In the MyCandidates page, enter the following code to include the CandidatesSearchTable into your MyCandidates page.

```
*All Candidates*
<wiki:include node="CandidateSearchTable"/>
```

The result is shown in FIG. 17, which is an example of a job candidate table 1701 within a user-editable website according to one embodiment of the present invention.

In the code above, the CandidateSearchTable has been specified in a separate wiki page and included on the MyCandidates page. Alternatively, the code from the CandidateSearchTable page could be directly included into the MyCandidates page, but by creating a separate page for the candidates table the developer can potentially include the table in any number of wiki pages giving plug-n-play style functionality.

Step 3: The developer can further modify the CandidateSearchTable to take in arguments and filter candidates based on their status. Edit your CandidateSearchTable page and replace the line

```
<wiki:search forFormName="candidate" order="time-"/>
``` with

```
<wiki:search forFormName="candidate" order="time-
" filter="${it/data/candidate/status = args/status}" />
```

The code above specifies that candidates should be filtered on their status. The args variable has the list of arguments passed to the wiki page. The args variable is a PredefinedVariable. The expression 'args/status' specifies the value of the status variable that is passed as an argument to the CandidateSearchTable page.

Go back to MyCandidates and modify the include tag to specify which candidates to show.

For example:

```
*Open Candidates*
<wiki:include node="CandidateSearchTable" status="Open" />
``` will show all open candidates and

```
*Rejected Candidates*
<wiki:include node="CandidateSearchTable" status="Rejected" />
``` will show all candidates who have been rejected. The developer can set the status variable to any of the different values to show candidates in the different stages of the interview process.

FIG. 18 is an example of another view of a job candidate table 1800 within a user-editable website according to one embodiment of the present invention, including a display of open candidates 1801 and rejected candidates 1802.

Example 11

Including Data from Other Websites

In one embodiment, the present invention can facilitate the inclusion of maps and other data from multiple sources on the resultant wiki page. The following example illustrates the creation of a lead management application that tracks potential client companies and aggregates information about the client company from various websites.

Step 1: Switch Default Edit Style setting to Script Markup mode by clicking on the Preferences link at the bottom of the right hand corner. Create a wiki form called ClientForm and add the following fields to the client form.

```
<wiki:form name="client">
| Client Company: | <wiki:field name="company_name" /> |
| Client Contact: | <wiki:field name="contact_name" /> |
| Address: ~(separate by comma)~ | <wiki:field name="address" size="50"/> |
| Phone: | <wiki:input name="phone" /> |
| Fax: | <wiki:input name="fax" /> |
| website: | <wiki:input name="website" /> |
</wiki:form>
```

Save the ClientForm and create a page called MyClients that has the createPage control to add new clients and a wiki table to display existing clients.

```
<wiki:control type="createPage" defaultForm="ClientForm" label="Go" />
My Clients:
<wiki:search forFormName="client" />
<wiki:table form="ClientForm" />
```

Figure 19:
FIG. 19 is an example of a client table within a user-editable website according to one embodiment of the present invention.

FIG. 19 is an example of a resulting client table 1900 according to one embodiment of the present invention.

Step 2: The next step is to pass the address information to the MapDisplay app already created in the JotSpotlibrary, to display the map. Edit the ClientForm and add the following code to the bottom of the page:

```
<wiki:include node="/Lib/Ext/MapDisplay" address="${page/data/client/address}" />
```

This piece of code includes the MapDisplay app available in the JotSpotLibrary using the IncludeTag and passes the address information in a variable called address to the app. The developer can reference variables in the wiki page using XPathExpressions.

Step 3 Search results for the client company on the client page can be included by adding the following two lines to the ClientForm.

```
<wiki:include node="/Lib/Ext/YahooNewsRSS" search="${page/data/client/company_name}" />
```

```
<wiki:include node="/Lib/Ext/Hoovers" search="${page/data/client/company_name}" />
```

The Yahoo and Hoovers applications are similar to the MapDisplay application and take a search term as the input argument. Save the ClientForm and return to your MyClients page. Enter some new clients from the MyClients page. Yahoo, Hoovers and MapQuest data about each client company can then be viewed on the client's wiki page.

FIG. 20 is an example depicting a resulting client company's page 2000 according to one embodiment.

Example 12

Reporting

With the ReportTag the developer can write reports over a collection of wiki pages. The following example illustrates how to use the ReportTag in the simple recruiting application discussed above and generate reports on the number of candidates and recruiters.

Add additional fields to the CandidateForm created in the Include Tag Cookbook by including the following lines between the <wiki:form> tags

```
| Recruiter: | <wiki:field name="recruiter" />|
| Candidate Rank:   | <wiki:field name="rank" selectOptions="1,2,3,4,5" /> |
```

The candidate form will look like this in the script markup mode.

```
<wiki:form name="candidate">
| Position: | <wiki:field name="position" /> |
| Name: | <wiki:field name="name" /> |
| Email: | <wiki:field name="email" /> |
| Phone: | <wiki:field name="phone" /> |
| Current Company: | <wiki:field name="company" />|
| Interview Status: |<wiki:field name="status" selectOptions="Open, In-Progress, Rejected, Extended, Accepted" /> |
| Recruiter: | <wiki:field name="recruiter" />|
| Candidate Rank:   | <wiki:field name="rank" selectOptions="1,2,3,4,5" /> |
Notes/Comments:
<wiki:field name="main/text" type="wiki" />
</wiki:form>
```

The createPage control in the MyCandidates page created in the earlier example allows entry of new candidates. The following code creates a createPage control for the CandidateForm

```
Enter new candidate:
<wiki:control type="createPage" defaultForm="CandidateForm" label="Go" />
```

After some sample data has been added, the ReportTag can be used to generate reports. The SearchTag can be used to collect all the wiki pages of the CandidateForm. The ReportTag can then be used along with the group tag to group data. Typically the SearchTag is used to collect all the wiki page into a set before using a ReportTag to generate the report

```
<wiki:search forFormName="candidate" order="time-"/>
<wiki:report>
   <wiki:group over="candidate/recruiter" title="Recruiter" />
</wiki:report>
<wiki:table>
   <wiki:column prop="Recruiter" />
   <wiki:column prop="Total" />
</wiki:table>
```

The line <wiki:group over="candidate/recruiter" title="Recruiter"/> groups candidates based on each recruiter.

So for example if 5 candidates were entered, assigned 2 to one recruiter and 3 to another, the above piece of code would result in:

| Recruiter  | Total |
|------------|-------|
| AlisonJaney | 2    |
| Lanny Lane  | 1    |
| MikeAllen   | 3    |

To report the number of open and rejected candidates per recruiter, another line of Script could be added in-between the report tags.

```
<wiki:report>
   <wiki:group over="candidate/recruiter" title="Recruiter" />
   <wiki:group over="candidate/status" title="status" />
</wiki:report>
```

| Recruiter   | Status   | Total |
|-------------|----------|-------|
| AlisonJaney | Open     | 1     |
| AlisonJaney | Rejected | 1     |
| Lanny Lane  | Open     | 1     |
| MikeAllen   | Open     | 2     |
| MikeAllen   | Rejected | 1     |

The developer can group up to any sub-level in this manner.

The application can be taken one step further so as to report on the average rank per recruiter. The average rank could be one of the metrics by which a company could track the quality of candidates a specific recruiter qualifies. In order to do this we use an aggregate tag that allows aggregation of ranks of the different candidates and application of the average function.

```
<wiki:search forFormName="candidate" order="time-" />
<wiki:report>
   <wiki:group over="candidate/recruiter" title="Recruiter">
    <wiki:aggregate over="candidate/recruiter" function="count" title ="Total" />
    <wiki:aggregate over="candidate/rank" function="avg" title="AverageRank" />
   </wiki:group>
</wiki:report>
```

```
<wiki:table>
   <wiki:column prop="Recruiter" />
   <wiki:column prop="Total" />
   <wiki:column prop="AverageRank" />
</wiki:table>
```

The code above specifies that we want to display the number of candidates per recruiter as well as compute the average rank of all the candidates assigned to a specific recruiter. The ReportTag reference documentation has a comprehensive list of functions that you can use in the aggregate and group reporting tags.

For a set of candidate with the following ranks and recruiters

| Name             | Recruiter   | Rank |
|------------------|-------------|------|
| Johnny Appleseed | Lanny Lane  | 1    |
| Vianna Chu       | MikeAllen   | 4    |
| Justin Lake      | AlisonJaney | 3    |
| Ben Smith        | MikeAllen   | 4    |
| August Mason     | AlisonJaney | 1    |
| Laney Jolie      | MikeAllen   | 3    | the report yields the following result.

| Recruiter   | Total | AverageRank |
|-------------|-------|-------------|
| AlisonJaney | 2     | 2           |
| Lanny Lane  | 1     | 1           |
| MikeAllen   | 3     | 3           |

Example 13

Modify Applications—Modify Templates in the Application Gallery

In one embodiment, the present invention facilitates modification of standardized applications. the following example illustrates modification of a project management application by adding custom fields, adding options to a pull-down menu and changing the information displayed.

Start by clicking on the edit button to edit the ToDoForm. The following code appears:

```
<wiki:if test="${action/mode='create'}">
<wiki:then>
<wiki:nodeinfo path="${req/args/parent}" name="pInfo" />
!!Add To-Do for project ${pInfo/data/project/name}
<wiki:var key="enName" value="${pInfo/data/project/name}" />
</wiki:then>
<wiki:else>
!!To-Do Details
Project Name #: ${page/data/todo/project}
<wiki:var key="enName" value="${page/data/todo/project}" />
</wiki:else>
</wiki:if>
<wiki:form name="todo">
<wiki:input controlType="hidden" name="project"
value="${enName}" />
<wiki:search forFormName="team" filter="${it/team/project = enName}"
collect="it/team/name" set="teamMembers" showHidden="true" />
<wiki:input type="pageName" uniquePattern="To-Do%U" />
```

-continued

```
| Name of To Do: | <wiki:field name="name" /> |
| Assigned to: | <wiki:field name="owner"
selectOptions="${teamMembers}" /> |
| Planned End Date: | <wiki:field name="due_date" type="date" /> |
| Actual End Date: | <wiki:field name="actual_due_date" type="date" />
|
| To Do Type: | <wiki:field name="type" selectOptions="Task, Action
Item" /> |
| Priority: | <wiki:field name="priority" selectOptions="1 High,
2 Medium, 3 Low" /> |
| Status | <wiki:field name="status" selectOptions="Not Started, In
Progress, Finished, Ongoing, On hold, Removed" /> |
Comments:
<wiki:field name="main/text" type="wiki" style="height: 10em; width:
40em" />
</wiki:form>
```

The form fields are defined between the two form tags. The developer can add to the select options on the status pull down menu by changing the selectOptions string. For example to add the option "Abandoned", Change the line

```
| Status | <wiki:field name="status" selectOptions="Not Started, In
Progress, Finished, Ongoing, On hold, Removed" /> |
``` to

```
| Status | <wiki:field name="status" selectOptions="Not Started, In
Progress, Finished, Ongoing, On hold, Removed, Abandoned" /> |
```

To add a new field to the form, simply add another line in between the tags and specify the form field name. For example, the line below adds a field of type date and name start_date to the ToDo form.

```
| Start Date: | <wiki:field name="start_date" type="date" />
```

Save the form and enter a new ToDo, to see the new select option and new form field.

To add some code on the project management home page so that the new form field, start date, can be viewed from the home page, the developer can edit the project management home page.

```
<wiki:search filter="${it/todo/owner = req/user}" forFormName="todo"
order="createTime-" set="todoList" />
<wiki:table contents="todoList">
<wiki:column header="To Do Item" sort="todo/name">
[[${it}][${it/todo/name}]]
</wiki:column>
<wiki:column header="Project" sort="todo/project">
[[${it/parent/name}][${it/parent/project/name}]]
</wiki:column>
<wiki:column prop="todo/status" header="Status" />
<wiki:column prop="todo/priority" header="Priority" />
<wiki:column prop="todo/due_date/date" header="Planned End Date" />
<wiki:column prop="todo/actual_due_date/date"
header="Actual End Date" />
<wiki:column prop="todo/type" header="Type" />
<wiki:column header="Comments">
<wiki:include node="${it}" part="main/text" />
</wiki:column>
</wiki:table>
```

Add another line between the table tags.

```
<wiki:column prop="todo/start_date/date" header="Start Date" />
```

Save the page to see the To-Do table with the new start-date column.

Formatting

The following is a guide to wiki markup.

Text Formatting

| Type in | What appears | Explanation |
|---|---|---|
| word or words | word or words | type plain text, plain text appears |
| *word or words* | word or words | enclosing words in * makes them bold |
| ~word or words~ | *word or words* | enclosing words in ~ makes them italicized |
| 'word or words' | word or words | enclosing words in = makes them fixed font |
| !Headline | Headline | small headline |
| !!Headline | Headline | bigger headline |
| !!!Headline | Headline | biggest headline |
| ----- | ---------------- | Entering 3 or more hyphens in a row creates a solid horizontal line on the page. |

Lists

| Type in | What appears | Explanation |
|---|---|---|
| * item a<br>* item b<br>* item a<br>  * item b<br>    * item c | • item a<br>• item b<br>• item a<br>  ○ item b<br>    ■ item c | 3 spaces and * creates a bullet item.<br><br>To create nested lists, use 3 additional spaces for each item. |
| 1 item a<br>1 item b<br>1 item c | 1. item a<br>2. item b<br>3. item c | 3 spaces and a number starts a numbered list. |
| * item a<br>  1 sub item a<br>    1 sub item b<br>  * item b | • item a<br>  1. sub-item a<br>  2. sub-item b<br>  • item b | You can combine bulleted, numbered, and nested lists. |
| * item b | • item b<br>• item c | |

TABLES

| Type in | What appears | Explanation |
|---|---|---|
| \|a\|b\|c\|<br>\|1\|2\|3\|<br>\|A\|B\|C\| | a b c<br>1 2 3<br>A B C | Use \| to create a table. Enclose each cell in \| |

| Linking | | |
|---|---|---|
| Type in | What appears | Explanation |
| WikiFormattingGuide | WikiFormattingGuide | CapitalizedWordsStuckTogether (or WikiWords) will produce a link automatically. |
| [[wiki formatting guide]] | wiki formatting guide | If you want multiple words with spaces to be a link, you need to surround the words with double brackets: [[ ]]. Note that "WikiFormattingGuide" and "wiki formatting guide" are completely different pages! One of them exists, and one has yet to be created. |
| [[http://www.yahoo.com][Yahoo]] | Yahoo | Lets the developer specify a link and anchor name |
| foo@bar.com | foo@bar.com | Email addresses are automatically linked |
| www.foo.com<br>http://www.foo.com/ | www.foo.com<br>http://www.foo.com/ | URLs are automatically linked |

| Images | |
|---|---|
| Action | What appears |
| To include an image in a document, follow these steps:<br>1. Press the Attach button<br>2. Press Browse to locate the image on the hard drive<br>3. Press the Upload Attachment button<br>4. Edit the page and enter this piece of html:<br>5. <img src="xxx.jpg" /> | |

Note:
To display an image that already exists on another website, the developer need only do this:
<img src="http://www.6646464646.com/xxx.jpg" />

Data Model
Pages

In one embodiment, every object in the system is represented by a page. Each unit of user content is a page, but pages are also used for:
user records (which store passwords and preferences);
themes (which control the look and feel of the wiki);
code libraries (the page becomes the unit of code reuse);
forms (described later—forms are analogous to schemas in a relational database);
and many other objects.

In one embodiment, every page has a unique address, and every page can be edited by a user with the appropriate permissions. Because in one embodiment every object is represented by a page, this means that every object in the system (users, themes, code libraries, etc.) is URL-addressable and editable from within the system. This provides uniformity of access and modification.

Properties

In one embodiment, all information contained in the page is stored in one or more properties, which are typed name-value pairs. A property name is an alphanumeric sequence, possibly with a path separator character. A property value is a data object with a specific type. Types include:
strings
numbers (integers and floating point)
dates and times
repeating events
binary data
XML The binary data property is used to store arbitrary web resources such as JPEGs, CSS stylesheets, Word or Excel documents, etc.

The XML data property is used to store structured data. The property can contain XHTML for showing web content, RSS for weblog content, or user-defined XML as needed. An expression language is used to extract specific pieces of an XML data structure.

Some properties are defined by the system. Examples include:
the time when the page was changed
the user who last edited the page
the list of users who are allowed to read the page
the default theme to be used when viewing the page However, any user can create new properties at any time. In one embodiment, there is no distinction between system-defined properties and user-defined properties.

Revisions

The system stores a full log of changes to each page. Every time a property is modified, a new version of the page is saved to disk. Users can revert to previous versions of a page at any time.

Transformations

A page is typically viewed through one or more transformations. Pages have a "raw" XML representation, which is always accessible. But typically a transformation is applied before viewing or editing a page. Transformations come in several types:
Evaluation transformation: the content of the page is evaluated. This means that the script content of the page is executed (which results in dynamic content). An example is the table tag: when this tag is evaluated, it replaces itself with an HTML table displaying the contents of a list of items.
Theme transformation: the content of the target page is surrounded by content from another page or pages. These other pages are called a theme, and typically they contain the HTML markup that represents the look and feel: the navigation bar, a header, a footer, a logo, etc. (This transformation is a specific case of the evaluation transformation.)
Form transformation: a form (which is just another page) is used to select a subset of properties from the target page. The form is like a filter or mask: it only allows certain properties to show through. (Like the theme transformation, this transformation is a specific case of the evaluation transformation.)
XSLT transformation: an XSLT stylesheet is applied to an XML property of the target page.

SVG transformation: an SVG renderer is used to convert an XML property of the target page into a PNG or JPEG image.

In the current implementation, most pages are passed through two transformations: an evaluating form transformation that selects the main/text property, and an evaluating theme transformation that surrounds the content of the main/text property with navigation chrome.

Functional Description

Functionally, there are four main components of the system.

Data Store

The data store manages the physical storage of pages and properties, including their revisions. There are multiple implementations of the data store API:

File-based: A page and its associated properties are serialized to XML and written to a file (one file per page). This implementation is not particularly efficient, but it can be useful for testing and for use on systems with limited resources (e.g. a laptop).

RDBMS-based: A page and its properties are mapped into a relational database. Typically the schema will contain a table for properties, with a many-to-one mapping from properties to pages. This implementation is useful for very large data sets.

Prevayler-based: Prevayler is a transactional Java object store. Pages and properties are represented as simple Java objects, and Prevayler persists them to disk transactionally using standard Java serialization.

SOAP: A SOAP-based store converts reads and writes into SOAP method calls against a remote endpoint. The endpoint can process the reads and writes however it wants. For example, the endpoint might be a Salesforce.com backend, in which case the Salesforce accounts appear as ordinary wiki pages inside the system.

Federated: The federated data store delegates requests to other data stores depending on the path. For example, it might delegate the FooCustomer page to a SOAP store and the BarCompany page to an RDBMS store.

Overlay: The overlay store merges properties from two different sources. When requesting FooPage, the overlay store might load foo/prop1 from one back-end store and foo/prop2 from another back-end store.

Caching: The caching store maintains an in-memory cache of pages read from another back-end store.

Typically, an implementation will use a complicated graph of stores, for example:

```
+ Caching
  + Federated
    + Overlay
      + SOAP
        + Prevayler
      + Prevayler
```

Auth Layer

The auth layer manages both authentication and authorization. Authentication is handled by matching a user against a particular page in the wiki. Authorization is handled by accessing specific properties (e.g. sys/readUsers for the ACL of users who are allowed to read the page).

Transformation Layer

The transformation layer access specific page properties, evaluates them according to certain rules (JotScript, XSLT, etc.), and returns the result.

Network Manager

The network manager converts incoming protocols (HTTP, RESTful XML, SOAP, SMTP, etc.) into wiki pages, and converts wiki pages back into outgoing protocols (HTML/HTTP, RESTful XML, RSS, Atom, SMTP, etc.).

Process Description

The process for reading or writing a page follows the layered functional description above:

An HTTP request arrives at the Network Manager, which maps it to a specific page.

The page is requested from the Transformation Layer.

The Transformation Layer passes the request to the Auth layer, which uses properties of the requested page to validate the user's access.

The Auth Layer then passes the request to the Data Store, which may in turn pass the request to other Data Stores. For example, the Federated store might examine the request and then delegate the request to a specific back-end.

The Auth Layer passes the response back up to the Transformation Layer.

The Transformation Layer may make other requests to the Auth Layer in the process of evaluating the response.

The Transformation Layer passes the final response to the Network Manager, which sends the response back out.

Email to Page

The system processes incoming email messages by testing the To: address.

In one embodiment, the following address format is used: DestinationPage+secretcode@mywiki.jot.com The message is routed to the wiki named mywiki. That wiki has a user-settable authentication code. If secretcode matches the mywiki's authentication code, then the mail is accepted. The mail is assigned to a page in the wiki as follows: if DestinationPage exists, then the mail is created as a sub-page of DestinationPage, with the mail's subject line as the name of the sub-page; if DestinationPage does not exist, then a new page called DestinationPage is created. In either case, the content of the email becomes the main/text property of the page. In addition, mail-related properties such as mail/subject and mail/from are set based on the email's header. Any attachments in the email message are stripped out and inserted into the wiki as separate pages.

One feature of the system is that mail messages become pages just like everything else, so they can be modified, deleted, indexed, searched, etc.

An example: Assume there is a wiki named foo.jot.com. The wiki has pages named Page1 and Page2. The wiki's authentication code is magic.

Mail sent to Page1+magic@foo.jot.com with subject Hello will create a sub-page of Page1 named Hello.

A second mail sent to Page1+magic@foo.jot.com with subject Hello Again will create a second sub-page of Page1 named Hello Again.

Mail sent to Page2+magic@foo.jot.com with subject Goodbye will create a sub-page of Page2 named Goodbye.

Mail sent to NewPage+magic@foo.jot.com will create a sub-page of InBox named NewPage. (Note that the subject is ignored because NewPage does not yet exist.)

What is claimed is:

1. A method of creating a structured, collaborative web application, comprising:

storing a plurality of page objects, each page object having a set of predetermined properties, each page object being individually addressable by a specific universal resource locator (URL), and each page object adaptable to include a plurality of user-defined properties, the plurality of page objects including:
  at least one content page object adapted to store and aggregate content; and
  at least one transformation page object including at least one content transformation adapted to be applied to another page object and to transform the other page object;
receiving from a requesting device a request for a web page of the web application;
forming the web page of the web application in response to the request;
by applying a first transformation page object containing a first content transformation to a first content page object to obtain and aggregate multiple website search results, wherein the first content transformation comprises:
  executing a first library application of the web application, the first library application searching a first website external of the web application using a first data item as an input argument to obtain a first search result, the first data item being a portion of the first content page object;
  executing a second library application of the web application, the second library application searching a second website external of the web application using a second data item as an input argument to obtain a second search result, the second data item being a different portion of first content page object from the first data item; and
  applying a form including a table to the first search result and the second search result to aggregate the first search result and the second search result in a table format on the web page; and
providing the web page to the requesting device, the web page including the aggregated first and second search results.

2. The method of claim 1, wherein page properties of a page object include a binary data property for storing arbitrary web resources in a binary file format in association with the page object.

3. A computer system of creating a structured, collaborative web application, comprising:
a computer processor configured to execute executable modules, the modules comprising:
a content data store, configured to store a plurality of page objects, each page object having a set of predetermined properties, and each page object adaptable to include a plurality of user-defined properties, the plurality of page objects including:
  at least one content page object adapted to store and aggregate content; and
  at least one transformation page object including at least one content transformation adapted to be applied to another page object and transform the other page object;
an authentication module, configured to receive from a receiving device a request for a web page of the web application, the authentication module being communicatively coupled with the content data store;
a transformation module, configured to form the web page of the web application in response to the request, the transformation module being communicatively coupled with the authentication module; and the transformation module configured to apply a first transformation page object containing a first content transformation to a first content page to obtain and aggregate multiple website search results, wherein the first content transformation comprises:
  executing a first library application of the web application, the first library application searching a first website external of the web application using a first data item as an input argument to obtain a first search result, the first data item being a portion of the first content page object;
  executing a second library application of the web application, the second library application searching a second website external of the web application using a second data item as an input argument to obtain a second search result, the second data item being a different portion of the first content page object from the first data item; and
  applying a form including a table to the first search result and the second search result to aggregate the first search result and the second search result in a table format on the web page; and
a response module, configured to provide the web application page to the requesting device for presentation of the aggregated first and second search results, the response module being communicatively coupled with the transformation module.

4. The system of claim 3, wherein:
the transformation module is further configured to execute script content of a page to result in dynamically generated content for the page.

5. The system of claim 3, wherein:
the transformation module is further configured to apply a theme transformation to a page and adjust the appearance of the page to which the theme transformation is applied.

6. The system of claim 3, wherein:
the transformation module is further configured to apply a form transformation to a page and select a set of page properties from the page to which the form transformation is applied.

7. The system of claim 3, wherein the page properties of a page object include a binary data property for storing arbitrary web resources in a binary file format in association with the page object.

8. A non-transitory computer readable storage medium storing computer executable instructions creating a structured, collaborative web application, the computer executable instructions comprising instructions for:
storing a plurality of page objects, each page object having a set of predetermined properties, each page object being individually addressable by a specific universal resource locator (URL), and each page object adaptable to include a plurality of user-defined properties, the plurality of page objects including:
  at least one content page object adapted to store and aggregate content; and
  at least one transformation page object including at least one content transformation adapted to be applied to another page object and to transform the other page object;
receiving from a requesting device a request for a web page of the web application;
forming the web page of the web application in response to the request
by applying a first transformation page object containing a first content transformation to a first content page object to obtain and aggregate multiple website search results, wherein the first content transformation comprises:

executing a first library application of the web application, from the first library application searching a first website external of the web application using a first data item as an input argument to obtain a first search result, the first data item being a portion of the first content page object;

executing a second library application of the web application, the second library application searching a second website external of the web application using a second data item as an input argument to obtain a second search result, the second data item being a different portion of the first content page object from the first data item; and applying a form including a table to the first search result and the second search result to aggregate the first search result and the second search result in a table format on the web page; and providing the web page to the requesting device, the web page including the aggregated first and second search results.

9. The computer readable storage medium of claim 8, wherein page properties of a page object include a binary data property for storing arbitrary web resources in a binary file format in association with the page object.

10. The method of claim 1, wherein the form groups the first search result and the second search result under separate headings in the table format.

11. The system of claim 3, wherein the form groups the first search result and the second search result under separate headings in the table format.

12. The computer readable storage medium of claim 8, wherein the form groups the first search result and the second search result under separate headings in the table format.

* * * * *